US010611498B2

(12) United States Patent
Schweighart et al.

(10) Patent No.: US 10,611,498 B2
(45) Date of Patent: Apr. 7, 2020

(54) RAIL RECOVERY SYSTEM FOR AIRCRAFT

(71) Applicant: Aurora Flight Sciences Corporation, Manassas, VA (US)

(72) Inventors: Samuel Schweighart, Manassas, VA (US); Andrew Coe, Manassas, VA (US); Jeffery Ensminger, Manassas, VA (US); Francesco Giannini, Falls Church, VA (US); Jeffrey Pace, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 561 days.

(21) Appl. No.: 15/685,593

(22) Filed: Aug. 24, 2017

(65) Prior Publication Data

US 2019/0061976 A1    Feb. 28, 2019

(51) Int. Cl.
*B64F 1/02* (2006.01)
*B64C 39/02* (2006.01)

(52) U.S. Cl.
CPC .............. *B64F 1/02* (2013.01); *B64C 39/024* (2013.01); *B64C 2201/021* (2013.01); *B64C 2201/18* (2013.01); *B64C 2201/182* (2013.01)

(58) Field of Classification Search
CPC ......... B64F 1/02; B64F 1/04; B64C 2201/182
See application file for complete search history.

(56) References Cited

U.S. PATENT DOCUMENTS

| | | |
|---|---|---|
| 1,738,261 A | 12/1929 | Perkins |
| 1,748,663 A | 2/1930 | Tucker |
| 1,836,010 A | 12/1931 | Audrain |
| 1,912,723 A | 6/1933 | Perkins |
| 2,009,296 A | 7/1935 | Mayo |
| 2,488,050 A | 11/1949 | Brodie |
| 2,653,777 A | 9/1953 | Barkey |
| 2,665,093 A | 1/1954 | Manfredi et al. |

(Continued)

FOREIGN PATENT DOCUMENTS

| | | |
|---|---|---|
| AT | 166552 | 8/1950 |
| CN | 106892129 | 6/2017 |

(Continued)

OTHER PUBLICATIONS

Extended European Search report for Application No. 18189253.0, dated Dec. 13, 2018.

(Continued)

*Primary Examiner* — Nicholas McFall
(74) *Attorney, Agent, or Firm* — Michael Stanley Tomsa; McAndrews, Held & Malloy, Ltd.; Eugene H. Nahm

(57) ABSTRACT

The present disclosure's side-arm recovery system enables large Unmanned Aircraft Systems (UASs) to operate from small vessels or from ground sites with a minimal footprint. The side-arm recovery system allows arresting an UAS independent of a runway. On the ground or on a ship, the system makes use of a specialized crane system that includes capture and energy absorption devices. A fuselage-mounted top-hook snags a horizontal cable and the arresting forces act in the plane of symmetry through the central structure of the UAS. After the capture energy is absorbed, the recovery system safely lowers the aircraft to a ground handling cart. The same system can be combined into a launcher and retriever system which further reduces the footprint by eliminating the need for a separate launcher.

23 Claims, 33 Drawing Sheets

(56) References Cited

U.S. PATENT DOCUMENTS

| | | |
|---|---|---|
| 2,734,697 A | 2/1956 | Brow |
| 3,336,005 A | 8/1967 | Dickerman |
| 3,484,061 A | 12/1969 | Niemkiewicz |
| 3,712,565 A | 1/1973 | Walander |
| 4,809,933 A | 3/1989 | Buzby et al. |
| 4,907,768 A | 3/1990 | Masseron et al. |
| 5,054,717 A | 10/1991 | Taylor |
| 5,109,788 A | 5/1992 | Heinzmann |
| 5,493,808 A | 2/1996 | Munday |
| 5,560,568 A | 10/1996 | Schmittle |
| 5,583,311 A | 12/1996 | Rieger |
| 5,716,032 A | 2/1998 | McIngvale |
| 6,264,140 B1 | 7/2001 | McGeer et al. |
| 6,604,732 B1 | 8/2003 | Brinker |
| 7,066,430 B2 | 6/2006 | Dennis et al. |
| 7,114,680 B2 | 10/2006 | Dennis |
| 7,143,974 B2 | 12/2006 | Roeseler et al. |
| 7,143,976 B2 | 12/2006 | Snediker et al. |
| 7,165,745 B2 | 1/2007 | McGeer et al. |
| 7,175,135 B2 | 2/2007 | Dennis et al. |
| 7,219,856 B2 | 5/2007 | Watts et al. |
| 7,410,125 B2 | 8/2008 | Steele |
| 7,472,866 B2 | 1/2009 | Heaston et al. |
| 7,578,467 B2 | 8/2009 | Goodrich |
| 7,611,094 B2 | 11/2009 | Rom |
| 7,686,247 B1 | 3/2010 | Monson et al. |
| 7,785,031 B2 | 8/2010 | Vellozzi et al. |
| 7,806,366 B2 | 10/2010 | Jackson |
| 7,954,758 B2 | 6/2011 | McGeer et al. |
| 8,172,177 B2 | 5/2012 | Lovell et al. |
| 8,276,844 B2 | 10/2012 | Kariv |
| 8,313,057 B2 | 10/2012 | Rednikov |
| 8,317,130 B1 | 11/2012 | Westman |
| 8,464,981 B2 | 6/2013 | Goldie et al. |
| 9,010,683 B2 | 4/2015 | Gundlach et al. |
| 2002/0069806 A1 | 6/2002 | Le Coz et al. |
| 2005/0191049 A1 | 9/2005 | Chapman |
| 2006/0186266 A1 | 8/2006 | Kennedy |
| 2006/0249623 A1 | 11/2006 | Steele |
| 2007/0051849 A1 | 3/2007 | Watts et al. |
| 2007/0108345 A1 | 5/2007 | McDonnell |
| 2007/0157868 A1 | 7/2007 | Wrage et al. |
| 2007/0228214 A1 | 10/2007 | Horak |
| 2008/0191091 A1 | 8/2008 | Hoisington et al. |
| 2008/0308673 A1 | 12/2008 | Liu |
| 2009/0107386 A1 | 4/2009 | Sampson et al. |
| 2009/0146002 A1 | 6/2009 | Lovette |
| 2009/0166469 A1 | 7/2009 | Prevost et al. |
| 2009/0189016 A1 | 7/2009 | Heppe et al. |
| 2009/0212157 A1 | 8/2009 | Ariton et al. |
| 2009/0224097 A1 | 9/2009 | Kariv |
| 2009/0242693 A1 | 10/2009 | Urnes, Sr. |
| 2009/0294584 A1 | 12/2009 | Lovell et al. |
| 2009/0314883 A1 | 12/2009 | Ariton et al. |
| 2010/0123041 A1 | 5/2010 | Nair et al. |
| 2011/0127378 A1 | 6/2011 | McDonnell |
| 2012/0187243 A1 | 7/2012 | Goldie et al. |

FOREIGN PATENT DOCUMENTS

| | | |
|---|---|---|
| DE | 4301671 A1 | 7/1993 |
| GB | 400292 | 10/1933 |
| GB | 402895 | 12/1933 |
| GB | 2416154 | 1/2006 |
| WO | 9802277 A1 | 1/1998 |
| WO | 2013112206 | 8/2013 |

OTHER PUBLICATIONS

Crane (machine) from Wikipedia, the free encyclopedia, retrieved from <http://en.wikipedia.org/wiki/Crane_(machine)> on Mar. 22, 2012 (19 pages).

Iowa class batleship, from Wikipedia, the free encyclopedia, retrived from <http://en.wikipedia.org/wiki/Iowa_class_battleship> on Mar. 5, 2012 (22 pages).

Sea state. from Wikipedia, the free encyclopedia, retrieved from <http://en.wikipedia.org/wiki/Sea_state> on May 6, 2012 (4 pages).

SkyHook (TM) brochure, The Insitu Group, 2004 (4 pages).

International Search Report; and Written Opinion for International Application No. PCT/US2012/055729 dated May 24, 2013.

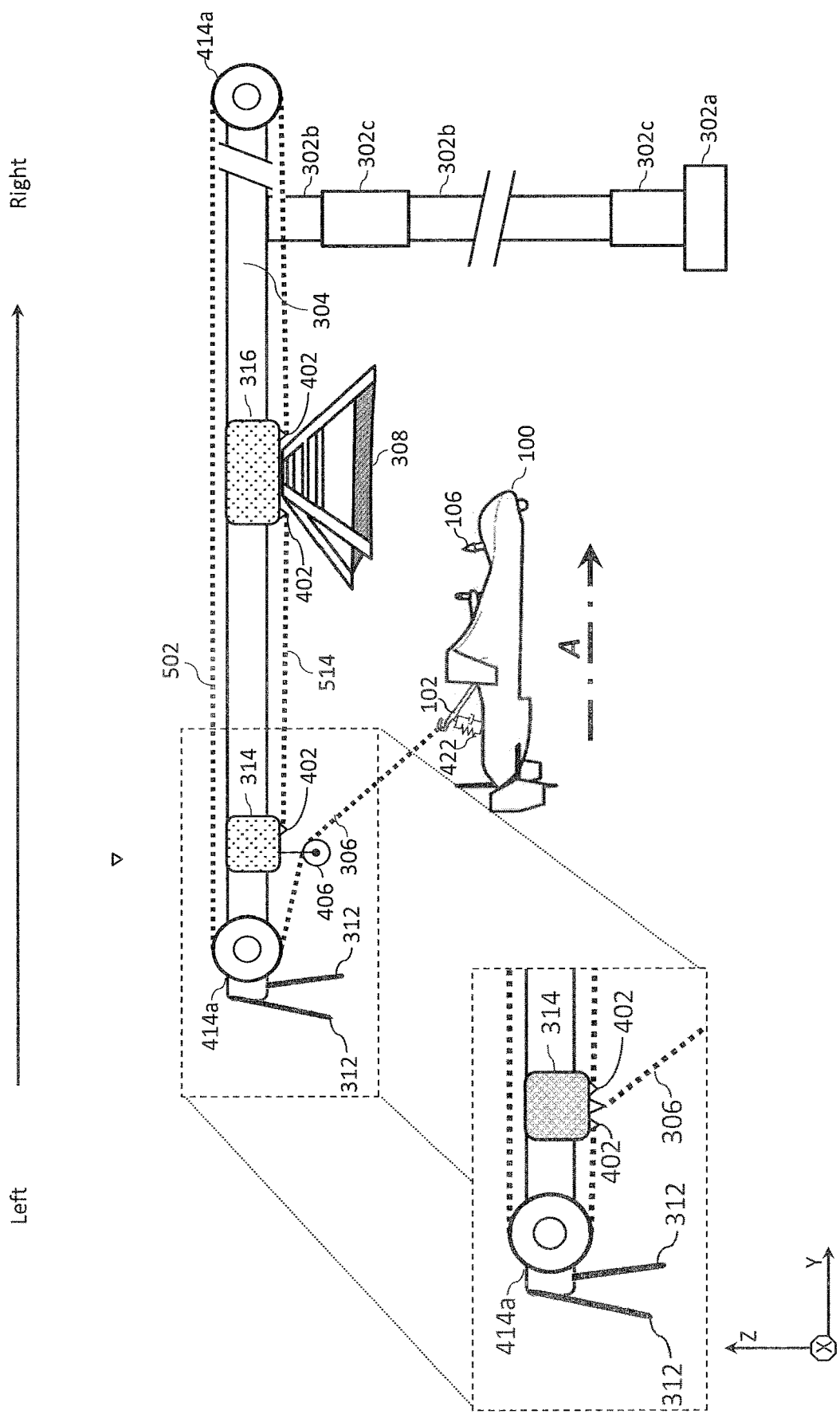

RAIL RECOVERY SYSTEM FOR AIRCRAFT

TECHNICAL FIELD

The present disclosure relates to systems and methods for use with Unmanned Aerial Vehicles ("UAVs") and Unmanned Aerial Systems ("UASs"). More specifically, the present disclosure relates to systems and methods for enabling the operation of UAVs and UASs from small vessels or from ground sites with minimal footprints.

BACKGROUND INFORMATION

As is well known in the art, fixed-wing aircraft typically require a runway to take off and land. And a runway requires a large surface area, be it man-made (e.g., asphalt, concrete, or a mixture of both) or natural (e.g., grass, dirt, gravel, ice, or salt). Unfortunately, because of land limitations or other space constrictions, not all situations facilitate runway usage. Therefore, rotorcraft and many smaller UASs are advantageous because they do not require a traditional runway. Moreover, runway independent UASs enable organic UAV deployment from locations where traditional runways may not be feasible, including, for example, ships, trucks, forward operating bases, clandestine locales, payload emplacements, and transitory emplacements.

Runway independence also offers greater flexibility and security than traditional aircraft. However, current runway independent UASs consist only of small-fixed wing platforms, which often weigh less than 135 lbs, and Vertical Take-Off and Landing ("VTOL") platforms, such as helicopters, lift-fan aircraft, and so on. VTOL platforms, while effective, often lack endurance because they need large, inefficient power plants to take off and land. VTOL platforms generally include rotorcraft (e.g., a helicopter), although other kinds of systems using lift fans and jet engines are also practical. Despite the advances in VTOL technology, fixed-wing UASs typically offer greater performance than VTOLs, but they are not inherently runway independent. Therefore, specialized launch and recovery systems are needed to operate fixed-wing UASs without runways.

Historically, the launch system has been the lesser challenge for fixed-wing, runway-independent systems. Rail launchers, for example, have been used for ship-based floatplanes since before World War II, and they remain a low-risk method for modern UASs. Recovery, on the other hand, has traditionally been more difficult because of the challenges posed by, for example, precision engagement, energy absorption, and post-capture handling. Furthermore, fixed-wing recovery systems such as nets and vertical cables are typically only practical on small UAVs and UASs.

Accordingly, there is a need for systems and methods for improving recovery systems for fixed-wing, runway-independent systems. More specifically, there is a need for systems and methods for improving recovery systems for fixed-wing, runway independent systems for use with larger aircraft by increasing the safety of capture and decelerating the UAV to controllable levels.

SUMMARY OF THE INVENTION

The present disclosure endeavors to provide a system, method and apparatus that allow large UASs to operate from small vessels or from ground sites while occupying a minimal footprint.

According to a first aspect of the present disclosure, a recovery system for capturing an aircraft in flight comprises: an articulating arm having a proximal end and a distal end, the articulating arm being secured to a surface at the proximal end; a rail coupled at the distal end of said articulating arm; a set of stanchions mounted to said rail; a first shuttle that is slideably coupled to said rail; an arresting cable coupled to said first shuttle, wherein the arresting cable is configured to stretch horizontally across the set of stanchions to capture the aircraft; a second shuttle that is slideably coupled to said rail, wherein said second shuttle is independent of said first shuttle; and a capture net coupled to said second shuttle, wherein the capture net is configured to reduce post-capture motion of the aircraft caused by capture of the aircraft by said arresting cable.

According to a second aspect of the present disclosure, a recovery apparatus for capturing an aircraft in flight comprises: a rail; a set of stanchions mounted to said rail; a first shuttle that is slideably coupled to said rail; an arresting cable coupled to said first shuttle, wherein the arresting cable is configured to stretch horizontally across the set of stanchions to capture the aircraft; a second shuttle that is slideably coupled to said rail, wherein said second shuttle is independent of said first shuttle; and a capture device coupled to said second shuttle, wherein the capture device is configured to reduce post-capture motion of the aircraft caused by capture of the aircraft by said arresting cable.

In certain aspects, the articulating arm is secured to the surface via a rotating base.

In certain aspects, the arresting cable is configured to engage a first hook positioned on the aircraft.

In certain aspects, the arresting cable is configured to engage a second hook positioned on the aircraft.

In certain aspects, the recovery system further comprises a payout mechanism to manage tension of the arresting cable.

In certain aspects, the payout mechanism is coupled to the arresting cable via a payout cable and a dual pulley assembly.

In certain aspects, the dual pulley assembly comprises a first pulley and a second pulley coupled to one another via a linkage bar.

In certain aspects, the payout cable is coupled via the first pulley and the arresting cable is coupled via the second pulley.

In certain aspects, the payout mechanism comprises a reel to let out or pull in the payout cable as a function of a load imparted on the arresting cable by the aircraft.

In certain aspects, the payout mechanism is configured to pay out the payout cable when the load imparted exceed a predetermined load threshold.

In certain aspects, the recovery system further comprises a deceleration mechanism to deaccelerate the first shuttle.

In certain aspects, the deceleration mechanism is coupled to the first shuttle via a deceleration cable.

In certain aspects, the deceleration mechanism comprises a reel to let out or pull in the deceleration cable as a function of a location of the first shuttle on the rail.

In certain aspects, the recovery system further comprises a cable slack system to provide an additional loop of deceleration cable.

In certain aspects, the cable slack system is to delay engagement of the deceleration mechanism.

In certain aspects, the first shuttle is coupled to the second shuttle via a shuttle cable.

In certain aspects, the second shuttle is configured to slide along the rail in response to a force imparted on the first shuttle.

In certain aspects, the second hook is configured to engaged the capture net through upward angular momentum of the aircraft generated from initial deceleration of the aircraft.

In certain aspects, forces and moments imparted by the aircraft are transferred to the surface via the articulating arm.

In certain aspects, the rail includes one or more rail hinges to facilitate folding of the rail for stowage.

In certain aspects, the rail is configured to operate as an aircraft launch rail.

In certain aspects, each of the set of stanchions is spring loaded and is configured to move up and outwardly upon capturing the aircraft.

In certain aspects, the surface is positioned on a vehicle, or portion thereof.

BRIEF DESCRIPTION OF THE DRAWINGS

These and other advantages of the present disclosure will be readily understood with reference to the following specifications and attached drawings, wherein:

FIGS. 5a through 5d illustrates a schematic view of example cabling arrangements for the side-arm recovery system.

DETAILED DESCRIPTION

Figure 1A:
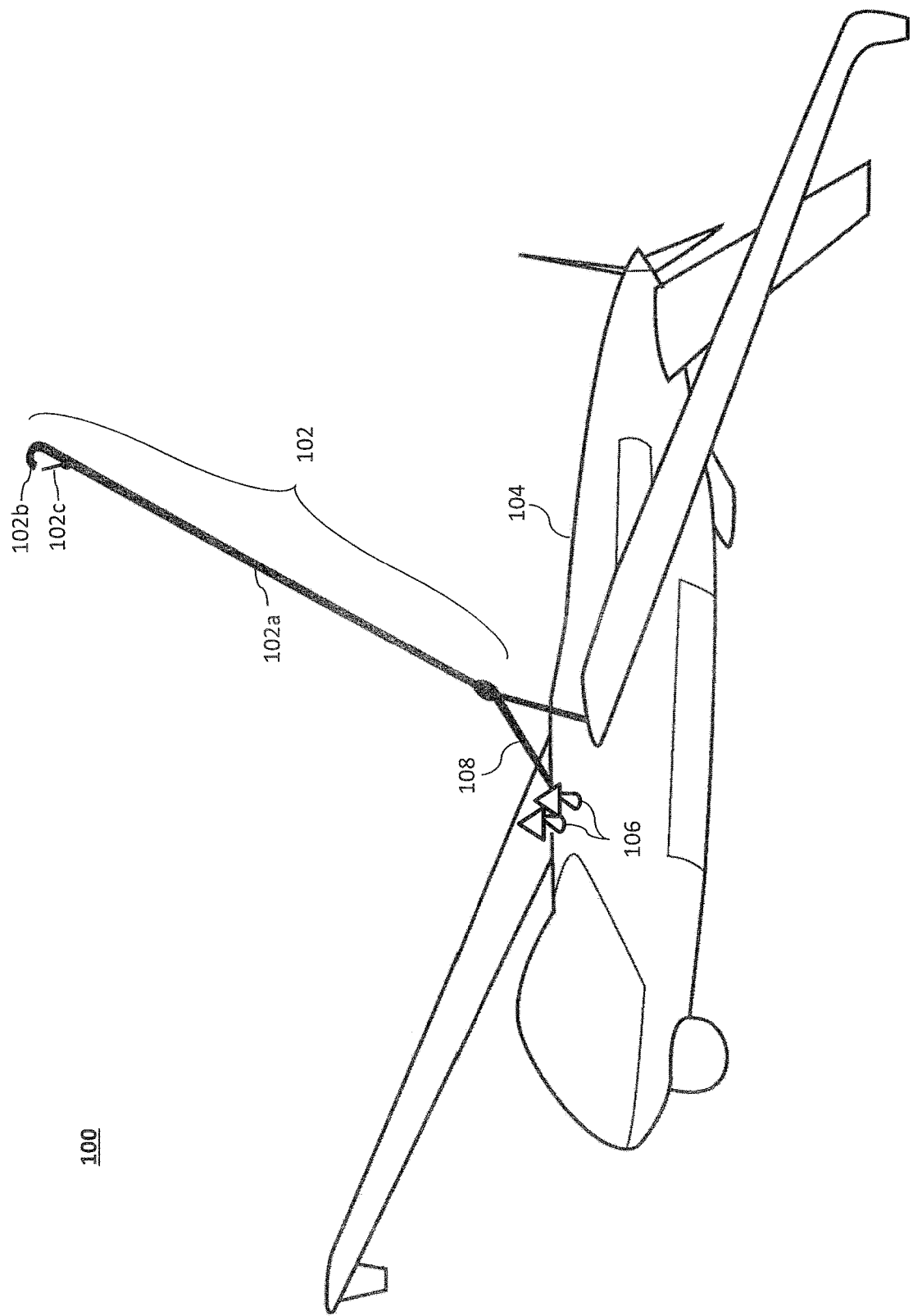
FIGS. 1a through 1f illustrate an aircraft equipped with a retractable top-hook assembly and forward fuselage hook that is configured for use with, for example, a side-arm recovery system.

Preferred embodiments of the present invention may be described hereinbelow with reference to the accompanying drawings. In the following description, well-known functions or constructions are not described in detail because they may obscure the invention in unnecessary detail. For this disclosure, the following terms and definitions shall apply.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

The terms "about" and "approximately," when used to modify or describe a value (or range of values), mean reasonably close to that value or range of values. Thus, the embodiments described herein are not limited to only the recited values and ranges of values, but rather should include reasonably workable deviations.

The terms "aerial vehicle" and "aircraft" refer to a machine capable of flight, including, but not limited to, both traditional runway and vertical takeoff and landing ("VTOL") aircraft, and also including both manned and unmanned aerial vehicles ("UAV"). VTOL aircraft may include fixed-wing aircraft (e.g., Harrier jets), rotorcraft (e.g., helicopters), and/or tilt-rotor/tilt-wing aircraft.

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para-aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may employ a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "exemplary" means serving as a non-limiting example, instance, or illustration. As utilized herein, the terms "e.g.," and "for example" set off lists of one or more non-limiting examples, instances, or illustrations.

As utilized herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

UAV applications continue to grow as a result of the ongoing advancements in UAS and UAV technology. For example, the Aurora Perseus-N design offers excellent mission performance and, when in the stowed position, occupies only 64×470 inches of hangar space—roughly half the footprint of an MH-60 helicopter. Although UAVs, such as the Perseus-N, offer excellent mission performance in the air, suitable mechanisms are needed to facilitate launch and recovery when runways are unavailable. Therefore, as discussed below, UASs (e.g., the Perseus-N aircraft) may be configured with a top-hook assembly 102 and forward fuselage hook 106 to enable effective launch and recovery using a side-arm recovery system 300. Indeed, a side-arm recovery system 300 could be configured to facilitate the safe, all-weather recovery of fixed-winged aircraft from small vessels, ground sites, stable surfaces, and/or other attachment surfaces, while occupying a minimal footprint. In certain aspects, the side-arm recovery system 300 may be further configured to enable the safe, all-weather launch of fixed-winged aircraft.

FIGS. 1a through 1f illustrate an aircraft 100 for use with a side-arm recovery system 300. As illustrated, the aircraft 100 may be equipped with a retractable top-hook assembly 102 and a forward fuselage hook (and/or barbs) 106. The top-hook assembly 102 may be mounted on a top surface of the airframe (e.g., the fuselage 104). As illustrated, the top-hook assembly 102 generally comprises, inter alia, a boom portion 102a, a hook portion 102b, and an extension mechanism 422 via a hinge apparatus 108. The extension mechanism 422 may be activated to extend and retract the top-hook assembly 102 relative to the fuselage 104 via the hinge apparatus 108, which may be in response to a signal from the onboard flight controller. The extension mechanism 422 may employ, inter alia, hydraulic, pneumatic, electro-mechanical, or mechanical spring actuators. The position of the top-hook assembly 102 relative to the aircraft's 100 center of mass can affect the moments imparted on the aircraft 100. Therefore, the aircraft's 100 pitch attitude can be adjusted, or limited, through strategic positioning of the top-hook assembly 102 on the fuselage 104. For example, the top-hook assembly 102 may be positioned aft of the aircraft's 100 center of mass.

During capture, the hook portion 102b may catch (i.e., capture) a horizontal arresting cable 306 coupled to the side-arm recovery system 300. To soften the initial impact upon contact with the horizontal arresting cable 306, the boom portion 102a may rotate and/or flex backwards. Similarly, the aircraft 100 can pitch upward upon contact between the boom portion 102a and the arresting cable 306, whereby the arresting cable 306 translates along the boom portion 102a until it reaches, and is secured by, the hook portion 102b. The hook portion 102b may contain a securing mechanism 102c to ensure that the arresting cable 306 does not exit the hook portion 102b during capture. For example, the securing mechanism 102c may be a spring-loaded gate/latch device that closes off the hook portion's 102b throat opening once the arresting cable 306 has been captured within the throat, thereby reducing the risk of the arresting cable 306 prematurely exiting the hook portion's 102b throat opening.

Figure 1B:
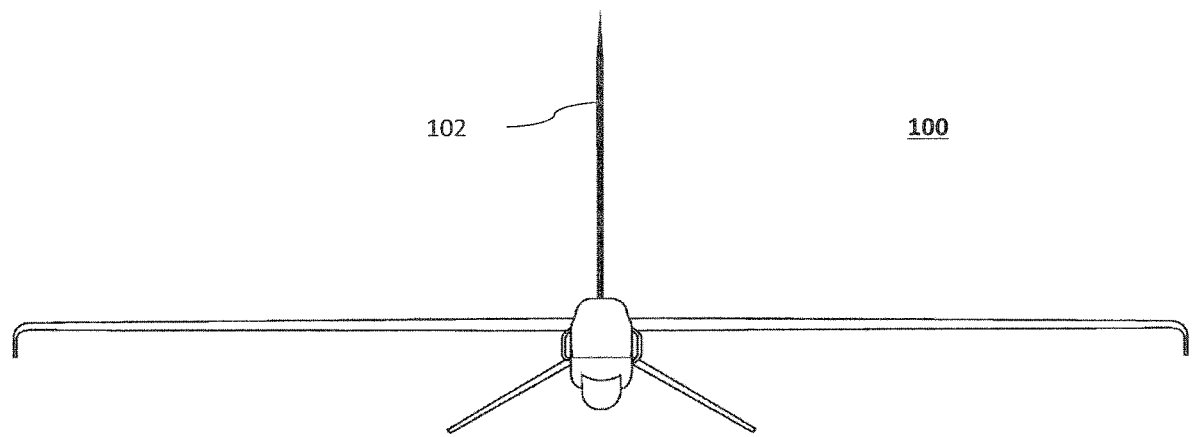
Figure 1C:
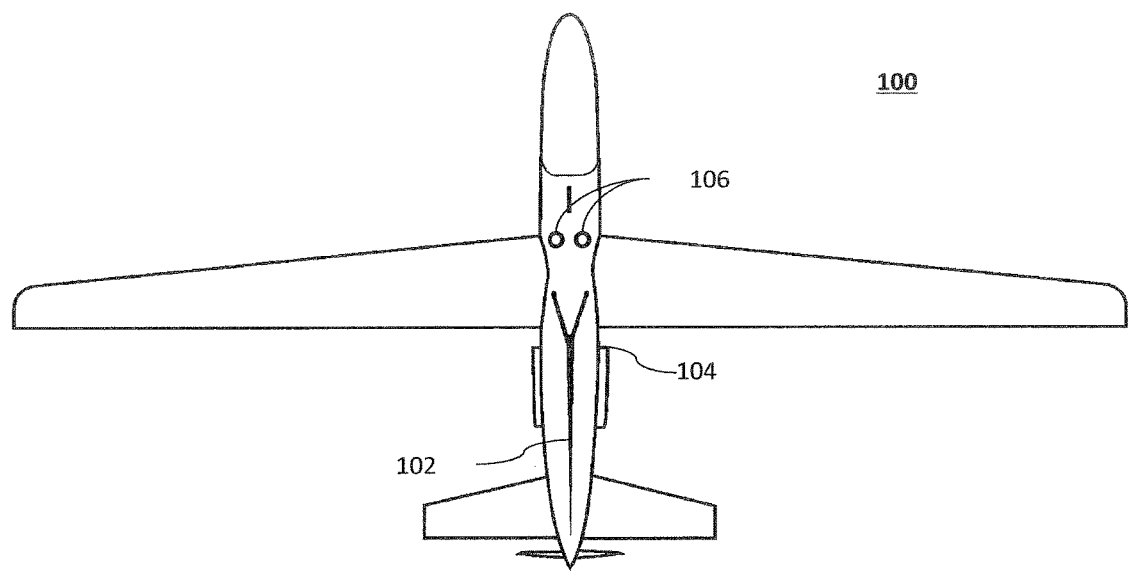
Figure 1D:
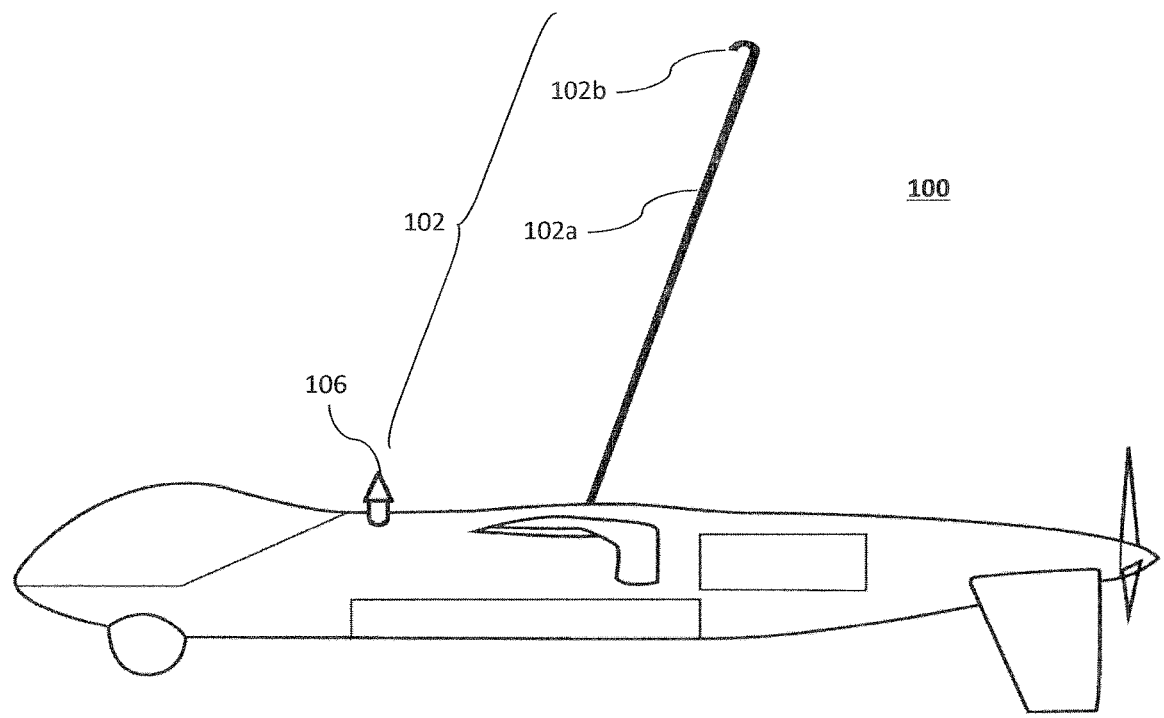
Figure 1E:
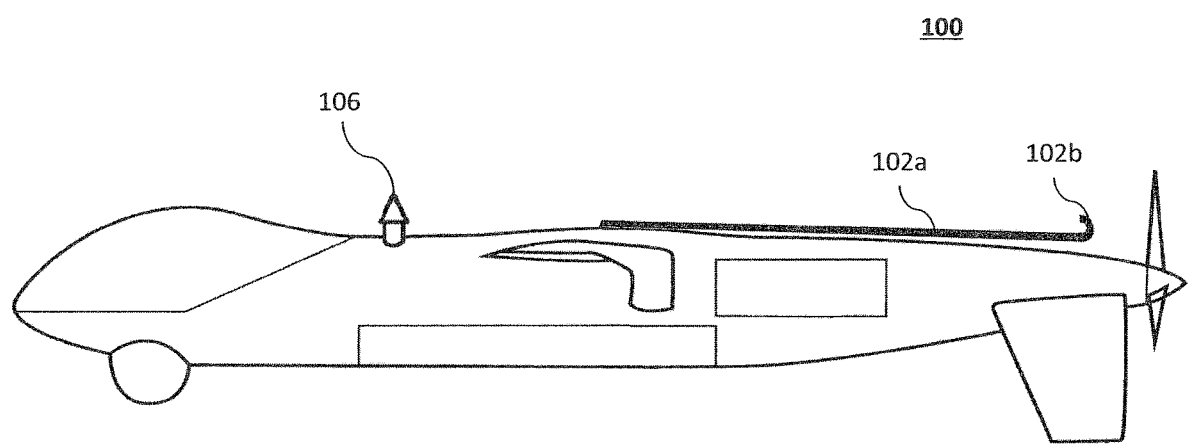

The top-hook assembly 102 may be located on the top side of an aircraft's 100 fuselage 104 and, as best illustrated in FIGS. 1c and 1e, may be retracted using the extension mechanism 422 to facilitate low cruise drag. FIGS. 1b and 1d illustrate front and side views of the aircraft 100 with the top-hook assembly 102 in the extended position, while FIGS. 1c and 1e illustrate top and side views the aircraft 100 with the top-hook assembly 102 in the retracted position. In the retracted position, the boom portion 102a and the hook portion 102b may lay on the top of, or substantially parallel to, the fuselage 104. To further reduce drag, the boom portion 102a and the hook portion 102b may reside (or otherwise fit) within a recessed compartment of the fuselage's 104 top surface when retracted. Accordingly, in operation, the top-hook assembly 102 may be retracted and stored along (longitudinally) the fuselage 104 during cruise and extended during approach for capture. A parallel spring and damper may be provided to mitigate rotation of the top-hook assembly 102 relative to the fuselage 104.

In operation, the extension mechanism 422 may also act as a spring-damper for capture loads. For example, the extension mechanism 422 may be used to provide a reaction (i.e compression force or torque moment) upon the boom portion 102a during engagement with the arresting cable 306. Accordingly, the reaction may be used to counter the forces and moments exerted on the boom portion 102a during engagement, which may cause the boom portion 102a to bend backward. Configuring the extension mechanism 422 to counter the capture forces and moments would assist in damping and absorbing loads during capture. The top-hook assembly 102 may be retractable in flight or left extended after activation. For in-flight retractable configurations, the top-hook assembly 102 may be retracted via hydraulic, pneumatic, electro-mechanical, or passive inertial or aerodynamic means.

Figure 1F:
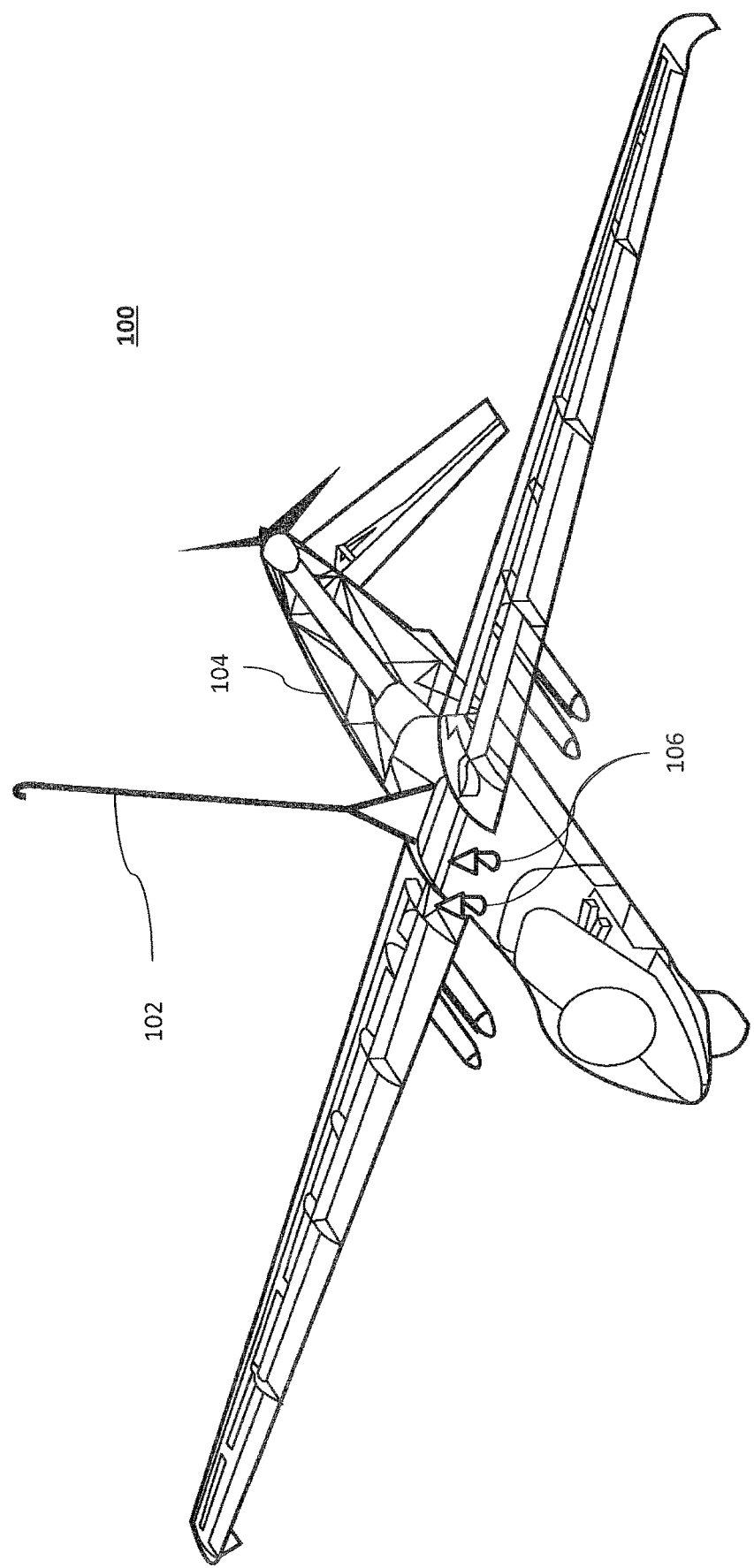

As illustrated in FIG. 1f, the top-hook assembly 102 may be attached to, or integrated with, the aircraft's airframe, such as a structural member in the central fuselage 104. To reduce weight, the structural member to which the top-hook assembly 102 is coupled may perform multiple functions. This is particularly applicable where the non-capture loads of the multi-function structural members may not be at their peak load value during capture. For example, the structural member to which the top-hook assembly 102 is coupled may also serve as a wing carry-through spar, a fuel tank bulkhead, a pressure bulkhead, a manufacturing break bulkhead, a module break bulkhead, a firewall, a ground handling interface, or a longitudinal member, such as a keel. The structural member used with the top-hook assembly 102 may be generally similar to structural members derived from the lower tail hooks of carrier-based aircraft. The structural member and/or top-hook assembly 102 may provide integrated interface points built into the fuselage 104 to facilitate the hoisting of the aircraft 100 during loading and unloading operations from shore cranes, or to secure the aircraft 100 as a slung load under a helicopter. Though a retractable single segment top-hook assembly 102 is depicted in FIGS. 1a-1f, the top-hook assembly 102 may employ a folding multi-segment boom portion 102a (e.g., multiple segments hingedly coupled end-to-end), telescoping boom portion 102a, inflatable boom portion 102a, a kite, and/or a non-retractable boom portion 102a. In situations where the top-hook assembly 102 is non-retractable, the hinge apparatus 108 and the extension mechanism 422 may be omitted.

In addition to the top-hook assembly 102, the aircraft 100 may further comprise one or more forward fuselage hooks 106 to capture a forward capture net 308 on a secondary shuttle of a side-arm recovery system 300. The capture net 308 may be used to reduce or eliminate post-capture motion of the aircraft 100 and to assist in deck handling by securing the aircraft via a second location. For example, the forward fuselage hooks 106 may penetrate and snag the forward capture net 308 to arrest the aircraft 100 is a desired position. The forward fuselage hook 106 may be positioned on the fuselage 104 and toward the front of the aircraft 100. The position of the forward fuselage hook 106 may be positioned based on positive capture of the capture net 308. Like the top-hook assembly 102, the forward fuselage hook 106 may be similarly retracted to reduce drag during forward flight. The forward fuselage hook 106 may contain a positive latching device to ensure that the aircraft 100 is secured to the capture net 308 during capture. To that end, the forward fuselage hook 106 may include one or more barbs, whose edges grip the capture net 308 during capture to prevent the forward fuselage hook 106 from exiting the capture net 308.

Although the aircraft 100 of FIGS. 1a-1g generally illustrate a fixed-wing, pusher-propeller aircraft (e.g., the Perseus-N, developed by the Aurora Flight Sciences), the present application is not limited to any particular aircraft. For example, as depicted in FIGS. 2a through 2f, a top-hook assembly 102 and forward fuselage hook 106 may be coupled with a wide variety of aerial vehicles, irrespective of the form of propulsion device. Example propulsion devices including, inter alia, propellers, jet engines, lift-fans, and so on. Accordingly, a number of general hook-airframe configurations are contemplated for use with a top-hook assembly 102 and side-arm recovery system 300.

Figure 2A:
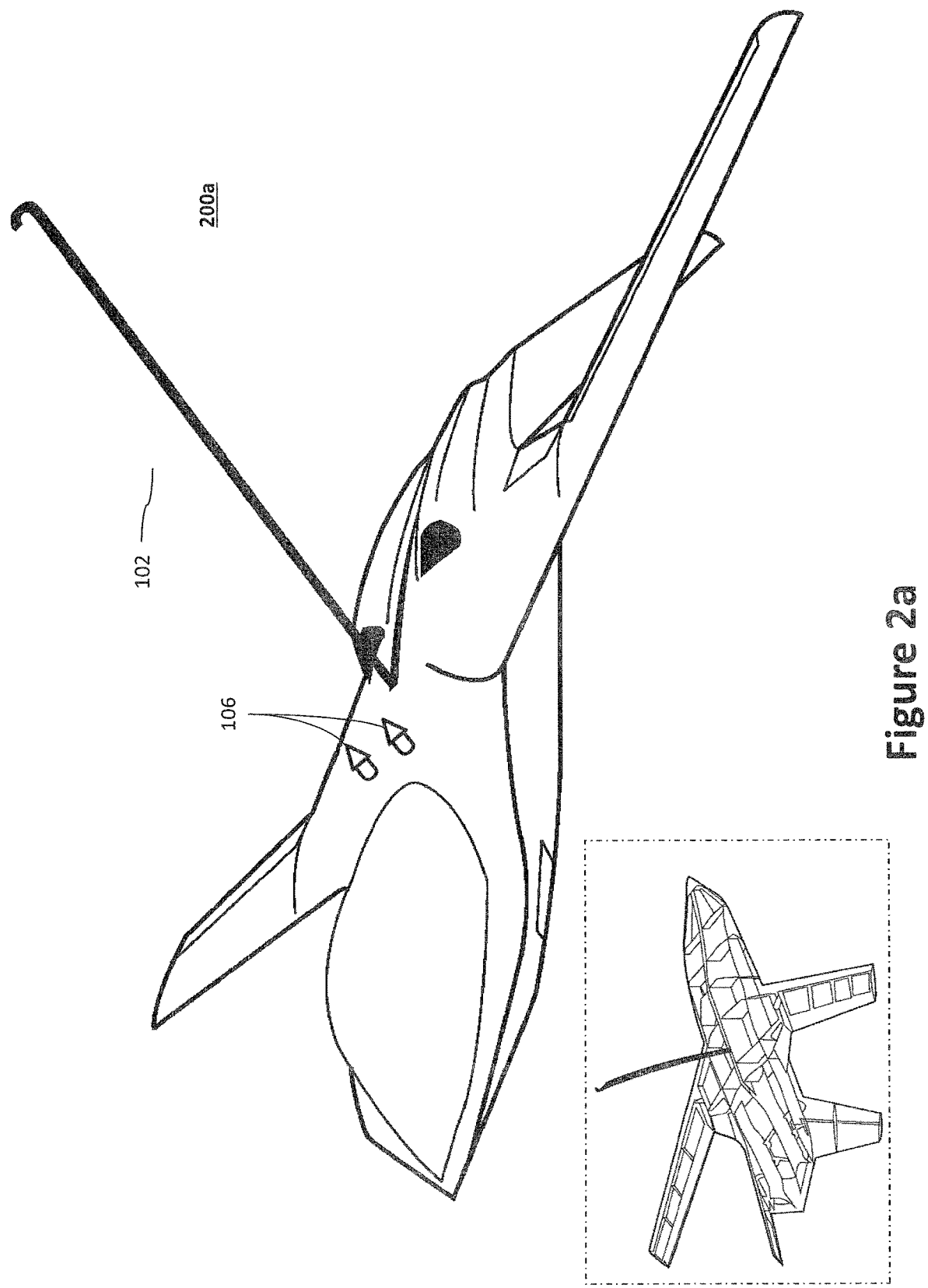
FIGS. 2a through 2g illustrate additional aircraft equipped with a retractable top-hook assembly and forward fuselage hook that is configured for use with, for example, a side-arm recovery system.

FIG. 2a illustrates a jet-powered aircraft 200a equipped with a top-hook assembly 102 and forward fuselage hook 106, where both hook assemblies may retract (e.g., during cruise). As illustrated, the boom portion 102a may be a one-piece unit that extends from the forward end of fuselage 104 to the aft end of the fuselage. As illustrated in the inset cut-away view of aircraft 200a, the top-hook assembly 102 may be attached to or integrated with a structural member in the central fuselage in a manner as described above in connection with the aircraft 100 of FIG. 1f.

Figure 2B:
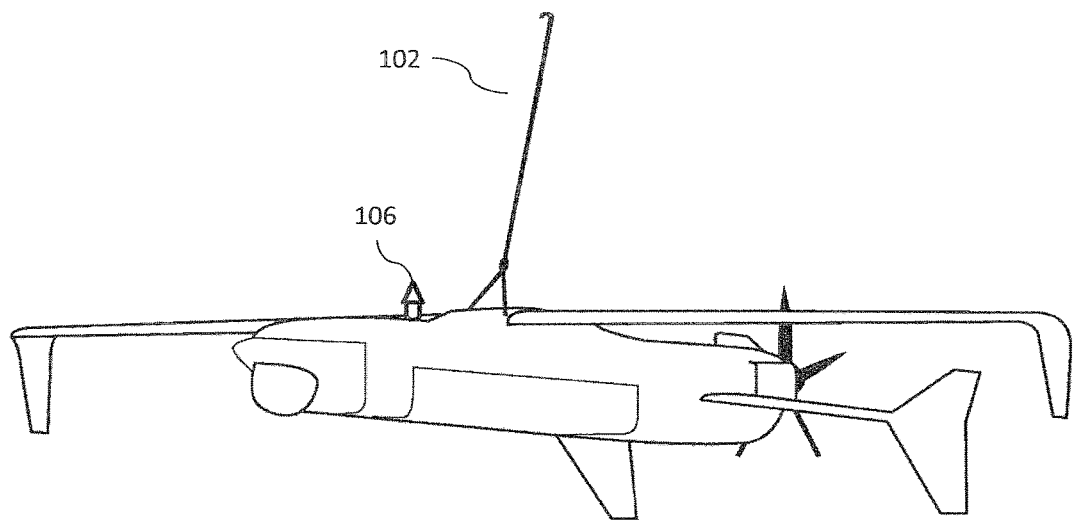

FIG. 2b illustrates a pusher-propeller aircraft 200b where the top-hook assembly 102 is configured to lay on top of, or substantially parallel to, the fuselage when retracted. Because pusher-propeller aerial vehicles are configured with propellers toward the aft end of the fuselage, it is important that the top-hook assembly 102 not interfere with the path of the propeller (i.e., the propeller sweep). For example, the length of the boom portion 102a may be designed such that it terminates just before the propeller when retracted. In yet another alternative, the boom portion 102a may be curved, bent, or otherwise formed such that the boom portion 102a does not lie in the path of the spinning propeller when retracted. For example, where a longer boom portion 102a is needed, the boom portion 102a may telescope, fold, and/or bend so that it does not interfere with the propeller when retracted. Additionally, the pusher-propeller aircraft 200b may include a forward fuselage hook 106. The forward fuselage hook 106 may also be retractable (e.g., telescopic, folding, etc.) to reduce air drag. The forward fuselage hook 106 may be extended or retracted, or contain a stopping platform that prevents the aircraft from catching its propellers on the capture net 308. In certain aspects, the forward fuselage hook 106 may be retractable or telescopic to reduce air-drag. Similarly, the forward fuselage hook 106 may be formed from multiple elements and configured to fold.

Figure 2C:
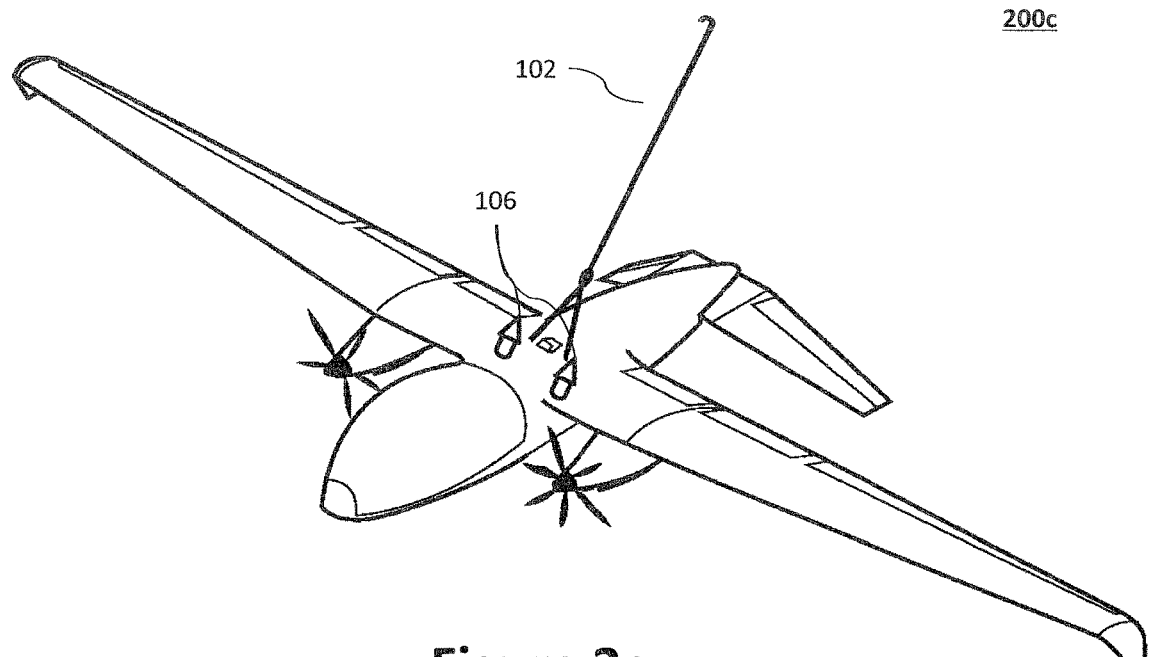

FIG. 2c illustrates a tractor propeller aircraft 200c where the top-hook assembly 102 is configured to lay on the top of, or substantially parallel to, the fuselage 104 when retracted. More specifically, twin wing-mounted engine/motor-driven propellers are located on each side of the fuselage 104 and a top-hook assembly 102 is located on the upper fuselage 104. As with other tractor-type aerial vehicles, a single element top-hook assembly 102 may be used without fear of propeller interference because there is no obstruction from a rear propeller. However, it remains entirely possible to employ a telescoping, folding, and/or bending boom portion 102a. Additionally, a tractor propeller aircraft 200c may include a forward fuselage hook 106 that is retractable. The forward fuselage hook 106 may be designed to be telescopic or fold to reduce air drag. The forward fuselage hook 106 may also be extended or retracted, or contain a stopping platform that prevents the aircraft from catching its propellers on the capture net 308.

Figure 2E:
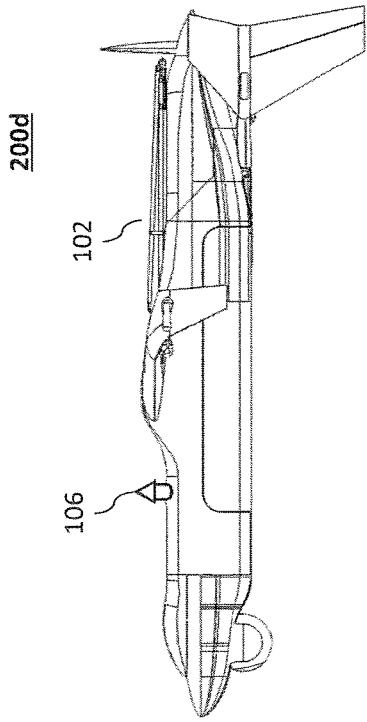
Figure 2G:
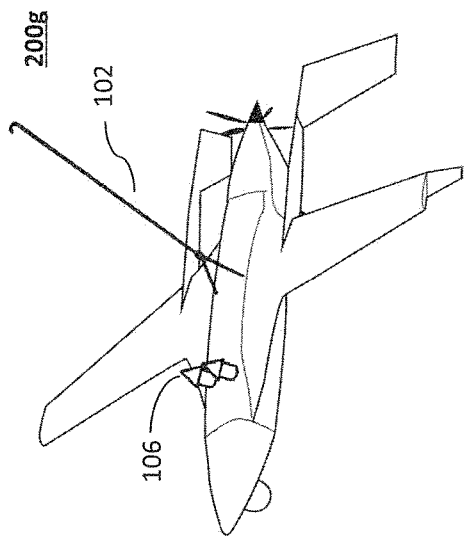
Figure 2D:
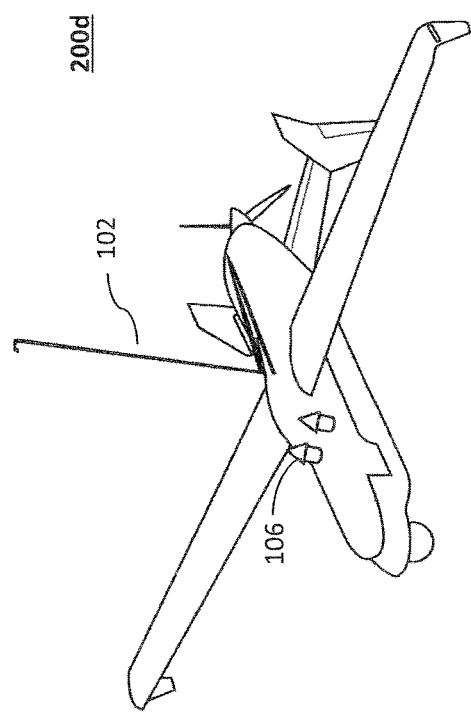

FIGS. 2d and 2e illustrate views of a pusher-propeller aircraft 200d where the boom portion 102a is segmented (e.g., multi-segments) and configured to fold when in the retracted position. Folding the boom portion 102a may be advantageous when the length of the boom portion 102a is greater than the length of the portion of fuselage 104 between the point where the top-hook assembly 102 is connected and the pusher-propeller. As illustrated in the side view of FIG. 2e, by folding the boom portion 102a, the boom portion 102a will not extend into and/or interfere with the propeller, which is positioned at the rear of the fuselage 104 in a pusher configuration. Alternatively, the boom portion 102a may telescope so that it does not interfere with the propeller when retracted. In yet another alternative, the boom portion 102a may be curved, bent, or otherwise formed such that the boom portion 102a does not lie in the path of the spinning propeller when retracted. Additionally, a pusher-propeller aircraft 200d may include a forward fuselage hook 106 that is retractable. The forward fuselage hook 106 may be designed to be telescopic or fold to reduce air drag. The forward fuselage hook 106 may also be extended or retracted, or contain a stopping platform that prevents the aircraft from catching its propellers on the capture net 308.

Figure 2F:
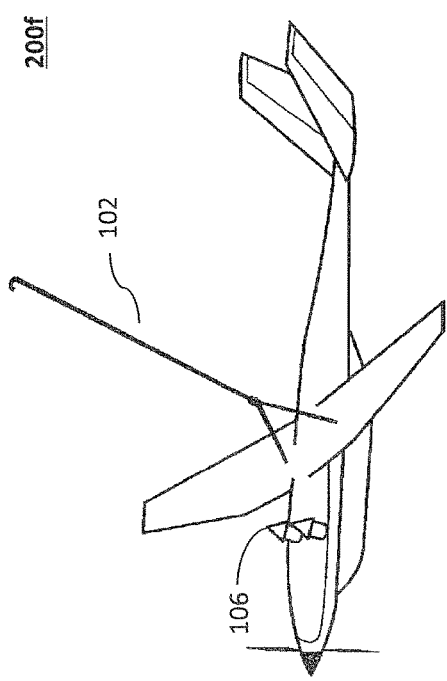

FIG. 2f illustrates a tractor-propeller aircraft 200f where the top-hook assembly 102 is configured to lay on the top of the fuselage 104 when retracted. More specifically, as with other tractor-type aerial vehicles, a single element top-hook assembly 102 may be used without fear of propeller interference because there is no obstruction from a rear propeller. However, it remains entirely possible to employ a telescoping, folding, and/or bending boom portion 102a. Additionally, a tractor-propeller aircraft 200f may include a forward fuselage hook 106 that is retractable. The forward fuselage hook 106 may be designed to telescope or fold to reduce air drag. The forward fuselage hook 106 may also be extended or retracted, or contain a stopping platform that prevents the aircraft from catching its propellers on the capture net 308.

FIG. 2g illustrates a pusher-propeller aircraft 200g where the boom portion 102a is segmented and is configured to fold when in the retracted position to avoid interference with the propeller. Alternatively, the boom portion 102a may telescope so that it does not interfere with the propeller when retracted. In yet another alternative, the boom portion 102a may be curved, bent, or otherwise formed such that the boom portion 102a does not lie in the path of the spinning propeller when retracted. Additionally, a pusher-propeller may include a forward fuselage hook 106 that is retractable. The forward fuselage hook 106 may be designed to be telescopic or fold to reduce air drag. The forward fuselage hook 106 may also be extended or retracted, or contain a stopping platform that prevents the aircraft from catching its propellers on the capture net 308.

While both a top-hook assembly 102 and a forward fuselage hook 106 are used throughout the application, similar hook assemblies may instead be employed on the bottom (i.e., underside) of the fuselage 104 to achieve capture. In operation, an aircraft equipped with a lower hook assembly may be rolled to an inverted position during approach to enable capture. Moreover, a non-retractable hook assembly may be used, eliminating the need for an extension mechanism 422 coupled with a hinge apparatus. Alternatively, the hook assembly may be rotated to the side of the aircraft and integrated with the wing when retracted. In yet another alternative, the hook may be positioned above the propeller's arc sweep, thereby permitting the use of a stand-alone hook or a hook on top of a boom portion 102a. Another suitable hook assembly may use a single-upper-element hook with inlets located on the side (one side or both sides) or bottom of fuselage 104.

Figure 3A:
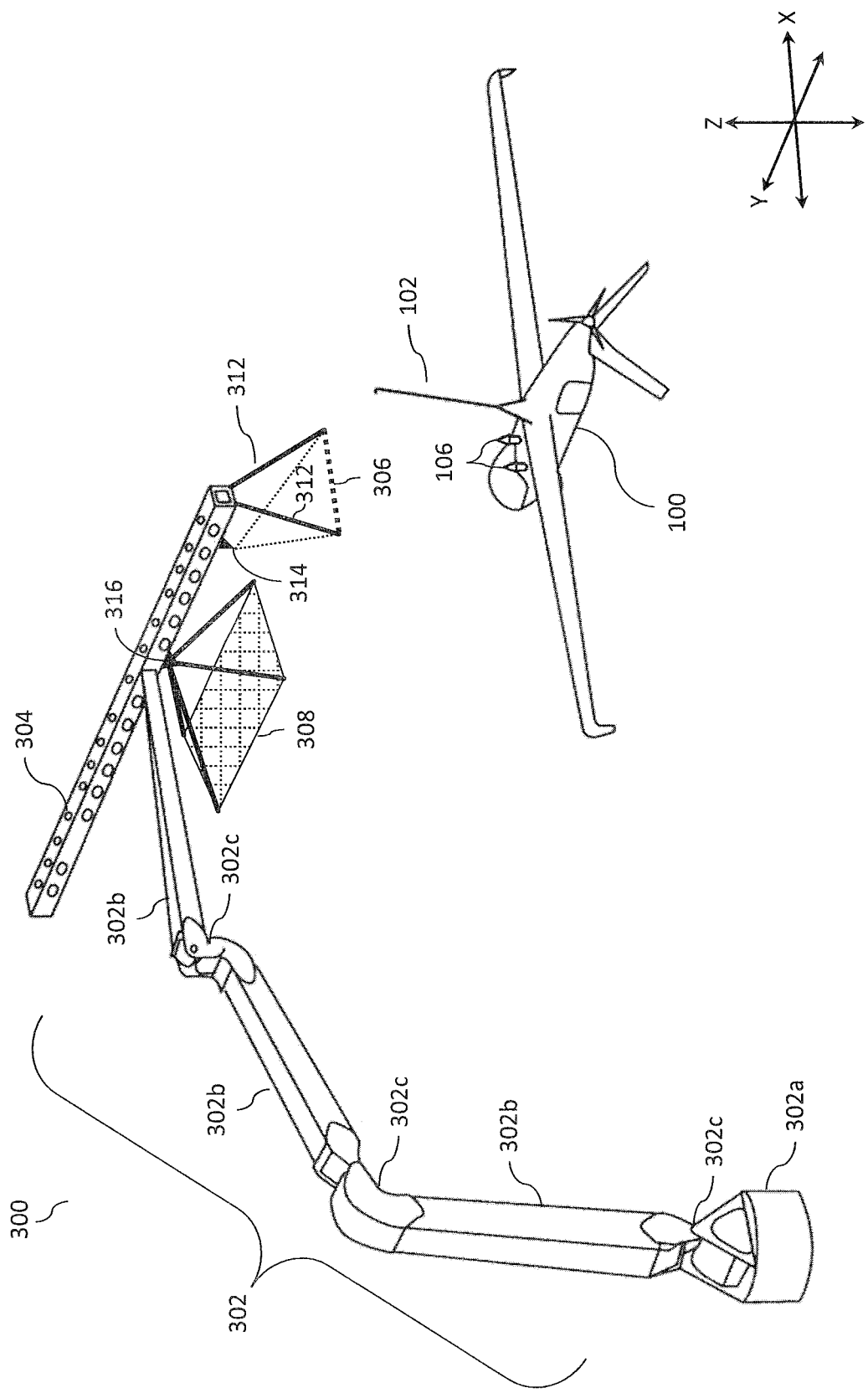
FIG. 3a illustrates an isometric view of an example side-arm recovery system.

FIG. 3a illustrates a side-arm recovery system 300. The side-arm recovery system 300 of FIG. 3a generally comprises an articulating arm 302, a rail 304 (e.g., a linear rail) supported by end of the articulating arm 302, an arresting cable 306, a capture net 308, a plurality of stanchions 312, and one or more shuttles (e.g., primary and secondary shuttles 314, 316) slideably coupled to the rail 304. As illustrated, the rail 304 may be coupled to a distal end of a fully articulating (e.g., adjustable) arm 302, where the proximal end of the articulating arm 302 is secured to a stable surface (i.e., a surface on which the side-arm recovery system 300 can be securely mounted). The rail 304 is responsible for transmitting all of the capture loads from the aircraft 100 into the side-arm recovery system's 300 structure. The rail 304 may also house two or more shuttles (e.g., the primary and secondary shuttles 314, 316) that ride (travel) along the length of the rail 304. As will be discussed, the rail 304 may also contain a plurality of sheaves and cables to transmit the load from an aircraft 100 during the capture event.

Figure 11:
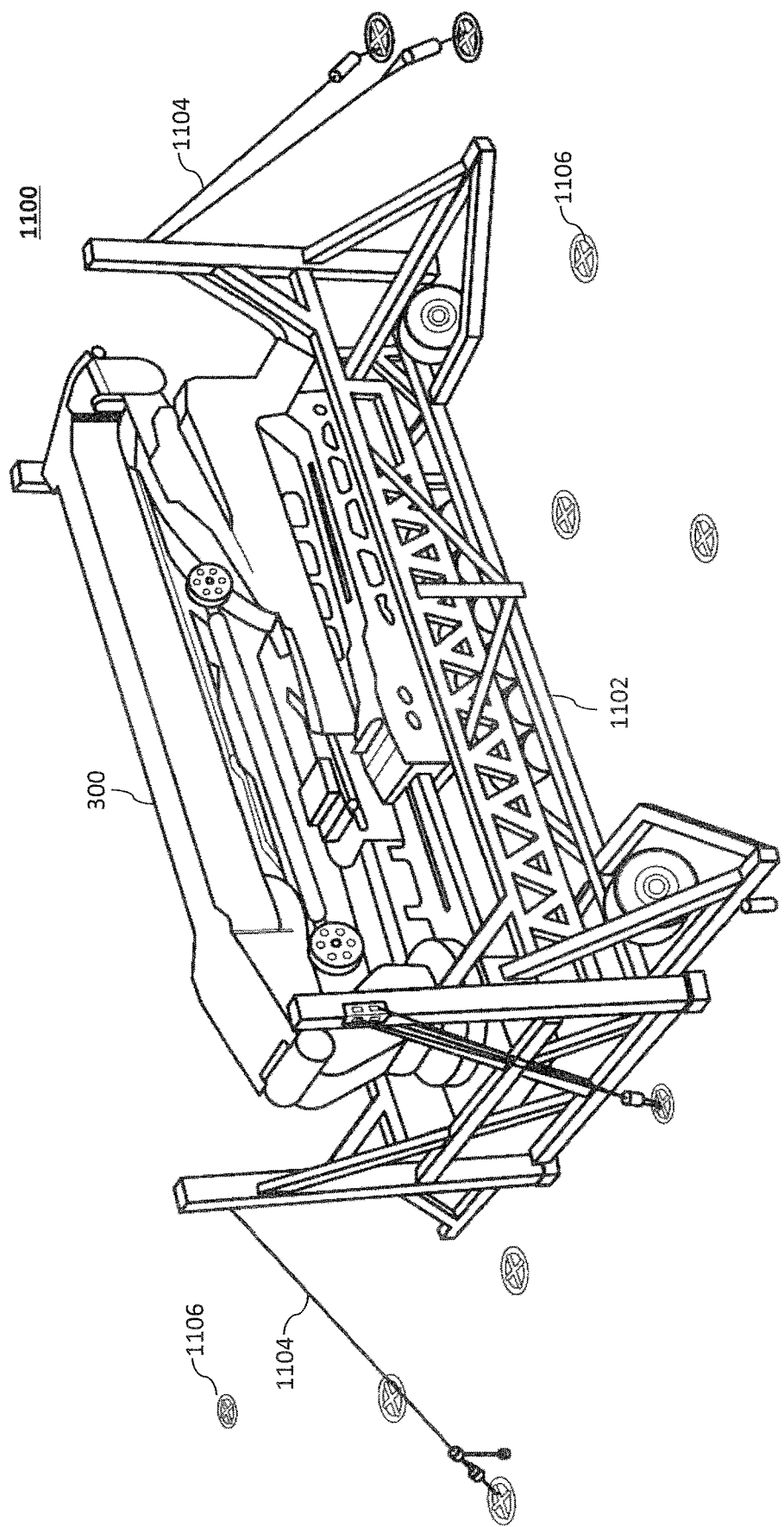
FIG. 11 illustrates a mobile chassis based side-arm recovery system.

The side-arm recovery system 300 may be installed on virtually any stable surface, including, inter alia, the ground (i.e., the Earth), a ship deck, a land-based vehicle, and/or a land structure, such as a building. However, for purposes of this application, the side-arm recovery system 300 will be generally described in shipboard and vehicle-mounted operations. In certain aspects, as illustrated in FIG. 11, the side-arm recovery system 300 may be semi-permanently installed such that the side-arm recovery system 300 may be relocated and/or removed between deployments.

The articulating arm 302 and the rail 304 may be constructed using one or more high strength metals (or alloys thereof) and/or composite materials. Suitable metals include, inter alia, steel, aluminum, titanium, and alloys thereof. In one aspect, the articulating arm 302 and rail 304 components may be constructed using, inter alia, Weldox 1300 high-strength steel. Weldox 1300 high-strength steel is particularly useful in marine applications; however, other materials may be employed depending on the application and/or as desired by the designer or fabricator.

The side-arm recovery system 300 is preferably sized, or otherwise configured, to facilitate recovery of an aircraft 100 at its maximum takeoff weight (e.g., with a full payload). The side-arm recovery system 300 can also be designed to occupy a small footprint and configured, or scaled, to fit a predetermined area as required by a given application—the footprint being generally defined by the size and shape of the base 302a. A small footprint facilitates use with vehicles and applications where space is somewhat limited, such as, a ship's deck, remote/congested structures, a shipping container (e.g., a 20' ISO container), and/or ground sites necessitating a minimal footprint. Moreover, to reduce unwanted movement (e.g., swaying) of the articulated arm 302, and to increase stability, the base 302a may be secured or otherwise anchored to a stable surface using one or more anchoring techniques, such as, for example, bolts, welding, weights, outriggers, cables, etc. While the base 302a illustrated in the various figures employs a smaller footprint, a larger base may be employed where possible to increase the size of the footprint, thereby increasing stability of the side-arm recovery system 300. That is, a larger base may be advantageous when a base 302a cannot be readily anchored or secured to the ground. For example, securing a base 302a to a relatively unstable surface (e.g., soft dirt or sand) can be difficult, thus, it may be advantageous to increase the surface area, thereby providing a platform, to reduce and/or eliminate reliance on the one or more anchoring techniques.

When not in operation, the recovery system 300 can be conveniently collapsed (i.e., stowed) and/or removed to facilitate, for example, other deck operations and to accommodate other aircraft. To facilitate rotational and pivotal movement, the articulating arm 302 may comprise a pivotable base 302a, and two or more boom sections 302b coupled end to end via a boom hinge 302c to form the articulating arm 302. The pivotable base 302a may be used to rotate the articulating arm 302 about an axis (i.e., parallel to the Z-axis). For example, the pivotable base 302a may rotate 180 degrees in each direction relative to the stable surface, thereby providing a total of 360 degrees of rotation. The articulating arm 302, which may be functionally akin to a loader crane (aka, a knuckle-boom crane or articulating crane), may be, for example, a fully articulated, hydraulically powered arm. The rail 304 may also be configured to folds into plural sections (e.g., four) for stowage. The plurality of jointed boom sections 302b may be folded into a small space when the articulating arm 302 is not in use to facilitate stowage. One or more of the boom sections 302b may be telescopic, thus providing a greater reach. When hydraulic systems are employed, the recovery system 300 may employ one or more engines for operating the hydraulic pump to enables operation of the articulating arm 302.

In certain aspects, the articulating arm 302 may have a degree of automation and be able to unload or stow itself without an operator's instruction. For example, a computer may be coupled with the articulating arm's 302 controller and used to initiate or transmit a self-stowing protocol upon command, thereby avoiding the need to manually guide the articulating arm 302 into a stowed position. Similarly, the computer may be further configured to instruct the articulating arm's 302 controller to assume a predetermined position (e.g., fully extended with the rail 304 positioned over the water). The articulating arm 302 may be fitted with a portable cabled or radio-linked control system (e.g., a portable computer, include laptops, tablet computers, PDAs, and smart phones) to supplement the crane-mounted hydraulic control levers. The radio-linked control system may employ one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), Military Standard 188 (MIL-STD-188), standard interface for multiple platform link evaluation (SIMPLE), etc.

Figure 3B:
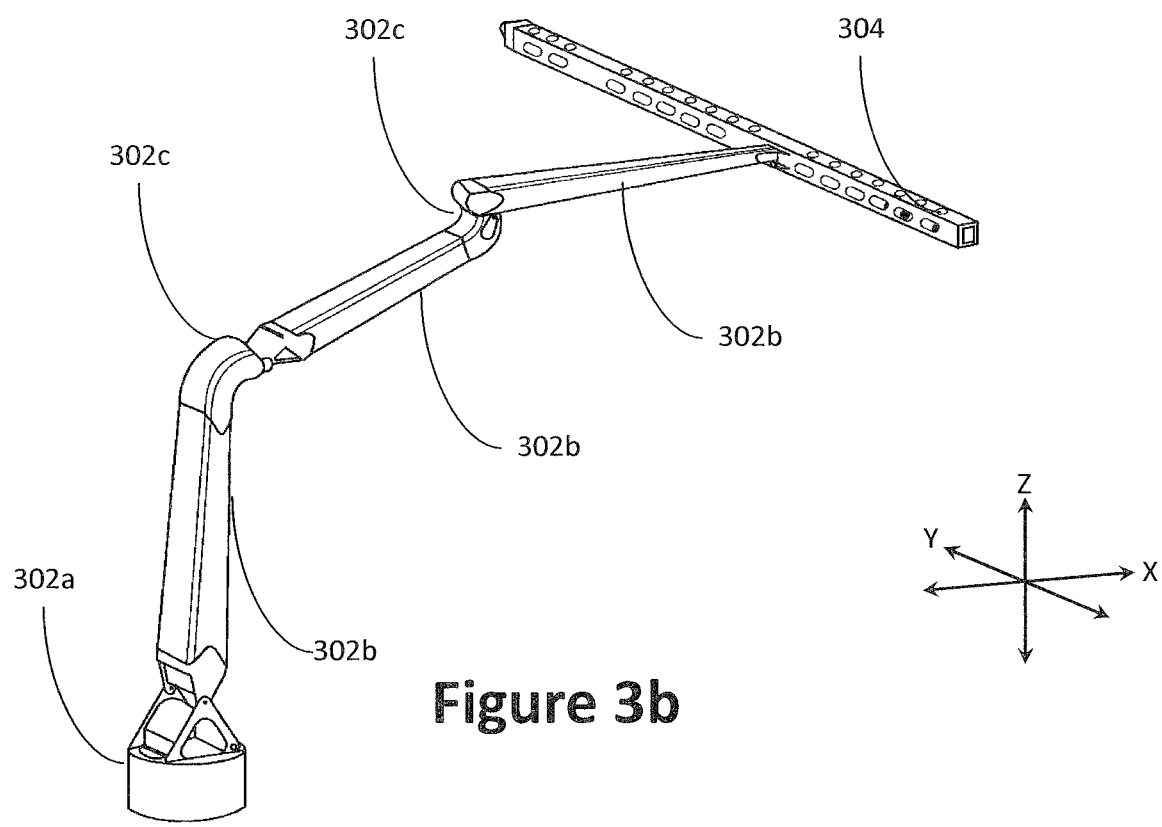
FIG. 3b illustrates an articulating arm having three boom sections and two boom hinges in the fully extended position with a rail positioned at the distal end of the articulating arm.
Figure 3C:
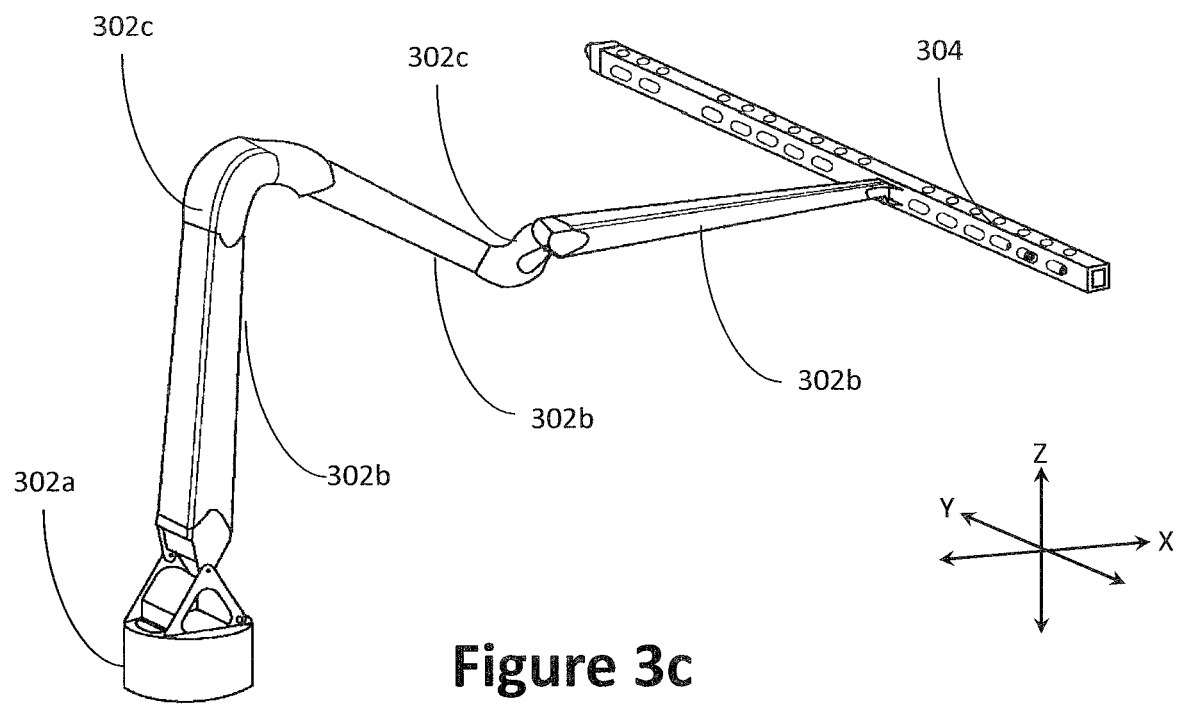
FIG. 3c illustrates the articulating arm of FIG. 3b in the first phase of collapse.

Thus, when not in use, the hydraulics and one or more boom hinges 302c may be used to collapse and stow the articulating arm 302. For example, FIG. 3b illustrates an articulating arm 302 having three boom sections 302b and two boom hinges 302c in the fully extended position with a rail 304 positioned at the end of the articulating arm 302. FIG. 3c illustrates the articulating arm 302 in a first phase of collapse where the first and second boom hinges 302c have folded such that the rail 304, which is positioned at the distal end of the articulating arm 302, is kept at substantially the same angle (e.g., substantially parallel to the ground), but where the distance between the rail 304 and the ground has been decreased.

Figure 3D:
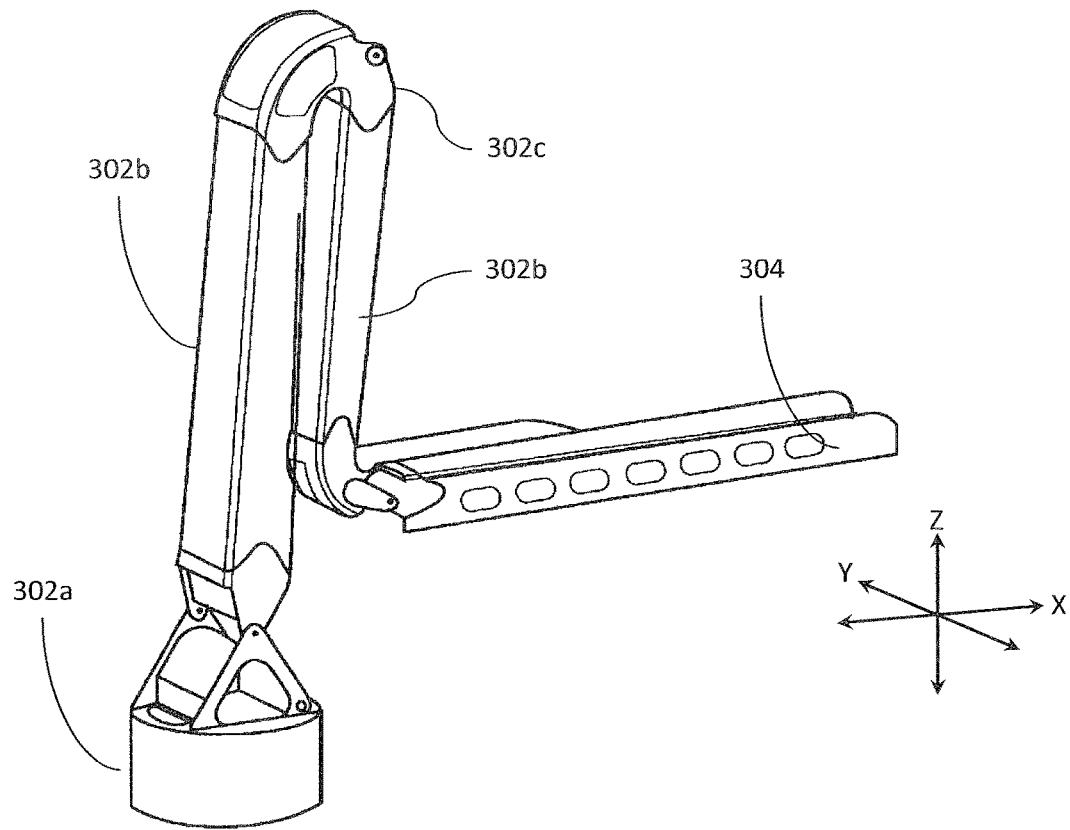
FIG. 3d illustrates the articulating arm of FIG. 3b in the second phase of collapse.
Figure 3E:
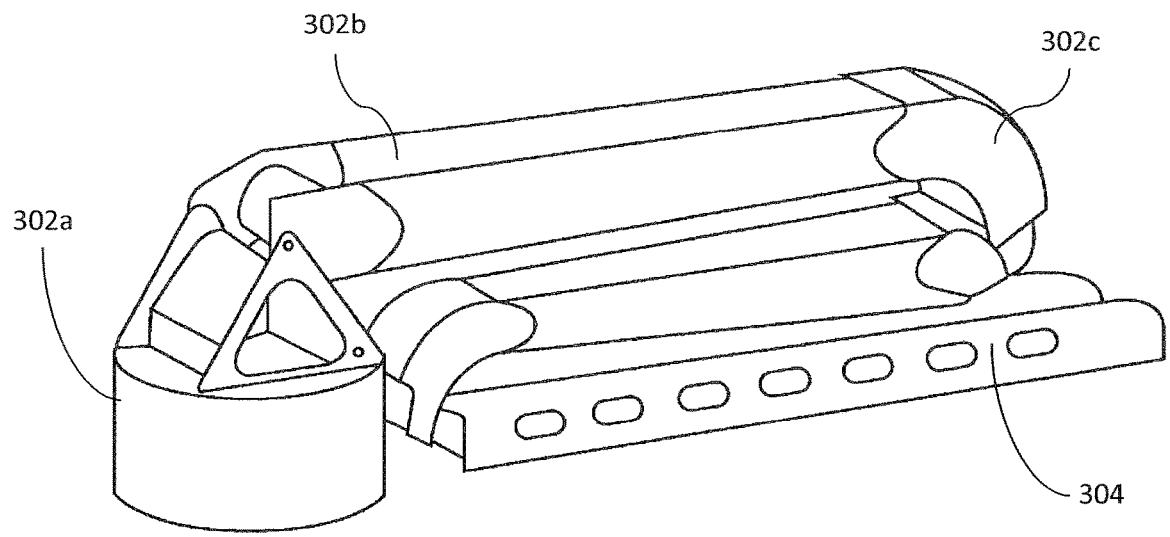
FIGS. 3e through 3g illustrate the articulating arm of FIG. 3b in a stowed configuration.
Figure 3F:
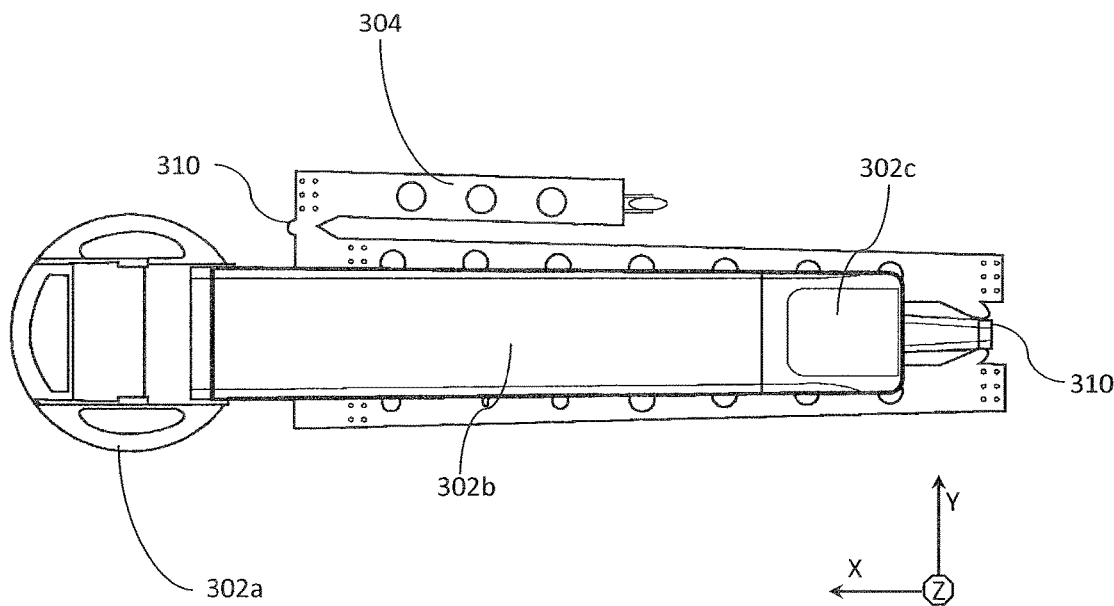
Figure 3G:
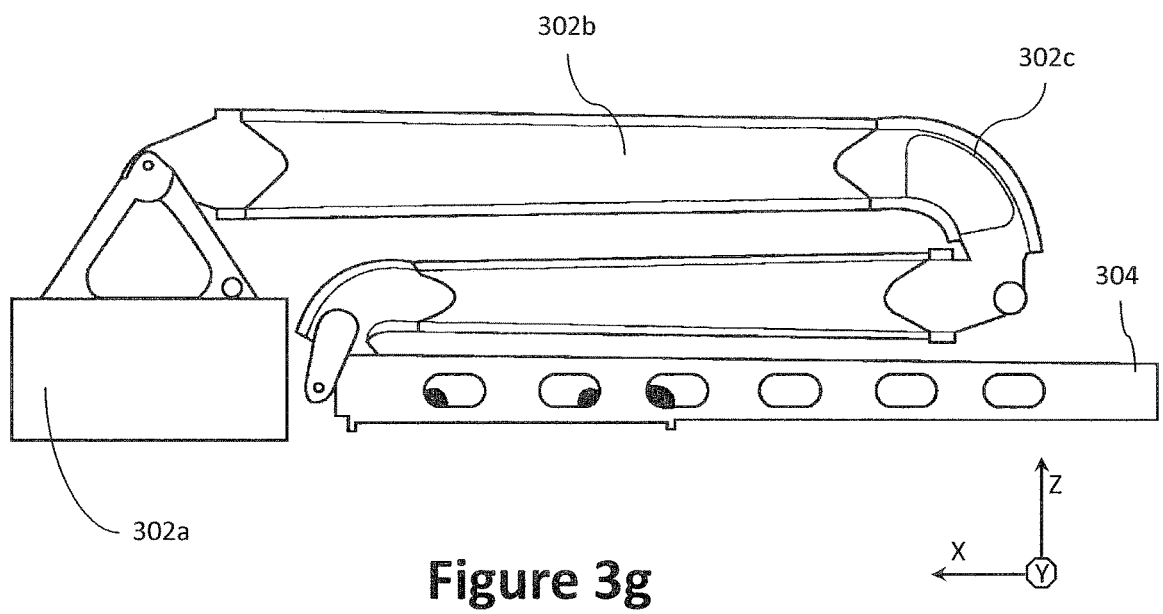

The rail 304 may comprise one or more rail hinges 310 along its longitudinal length to facilitate folding for stowage. For example, FIG. 3d illustrates the articulating arm 302 in a second phase of collapse where the first and second boom hinges 302c have been further folded and the rail 304 has also been folded using one or more rail hinges 310. FIG. 3e illustrates the articulating arm 302 in a third and final phase of collapse (i.e., stowed) where the first and second boom hinges 302c have been fully folded such that the boom sections 302b are substantially parallel to each other and the rail 304, which may still be folded, is positioned on or near the ground. FIG. 3f illustrates a top plan view of the fully folded articulating arm 302 and rail 304 of FIG. 3e. FIG. 3g illustrates a side view of the fully folded articulating arm 302 and rail 304 of FIG. 3e. Where a computer is used to facilitate automation, the articulating arm 302 may, upon command, automatically take the stowed position—illustrated in FIGS. 3e through 3g.

Figure 4A:
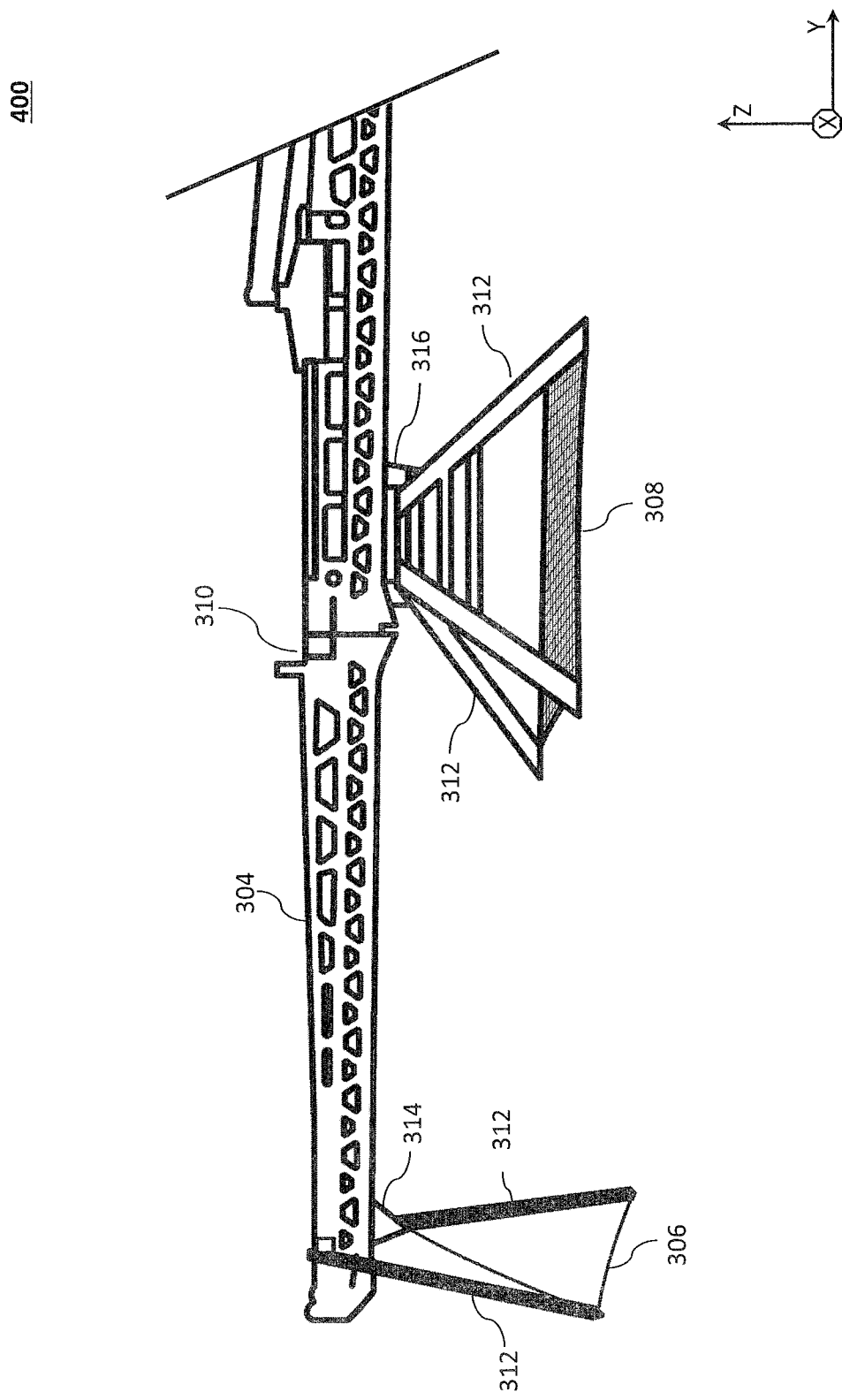
FIGS. 4a through 4d illustrate detailed views of a primary shuttle, secondary shuttle, and a capture net coupled thereto.
Figure 4B:
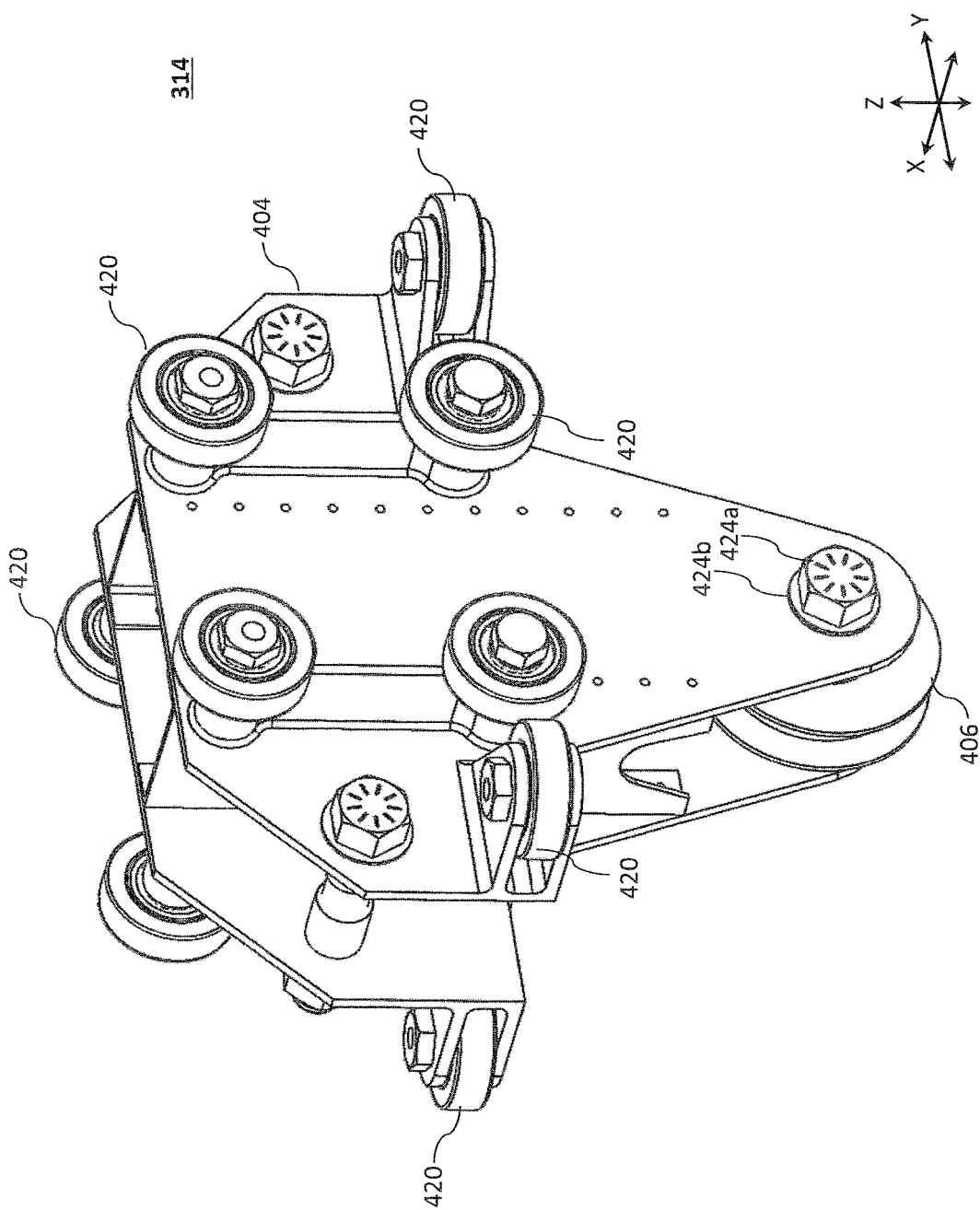
Figure 4C:
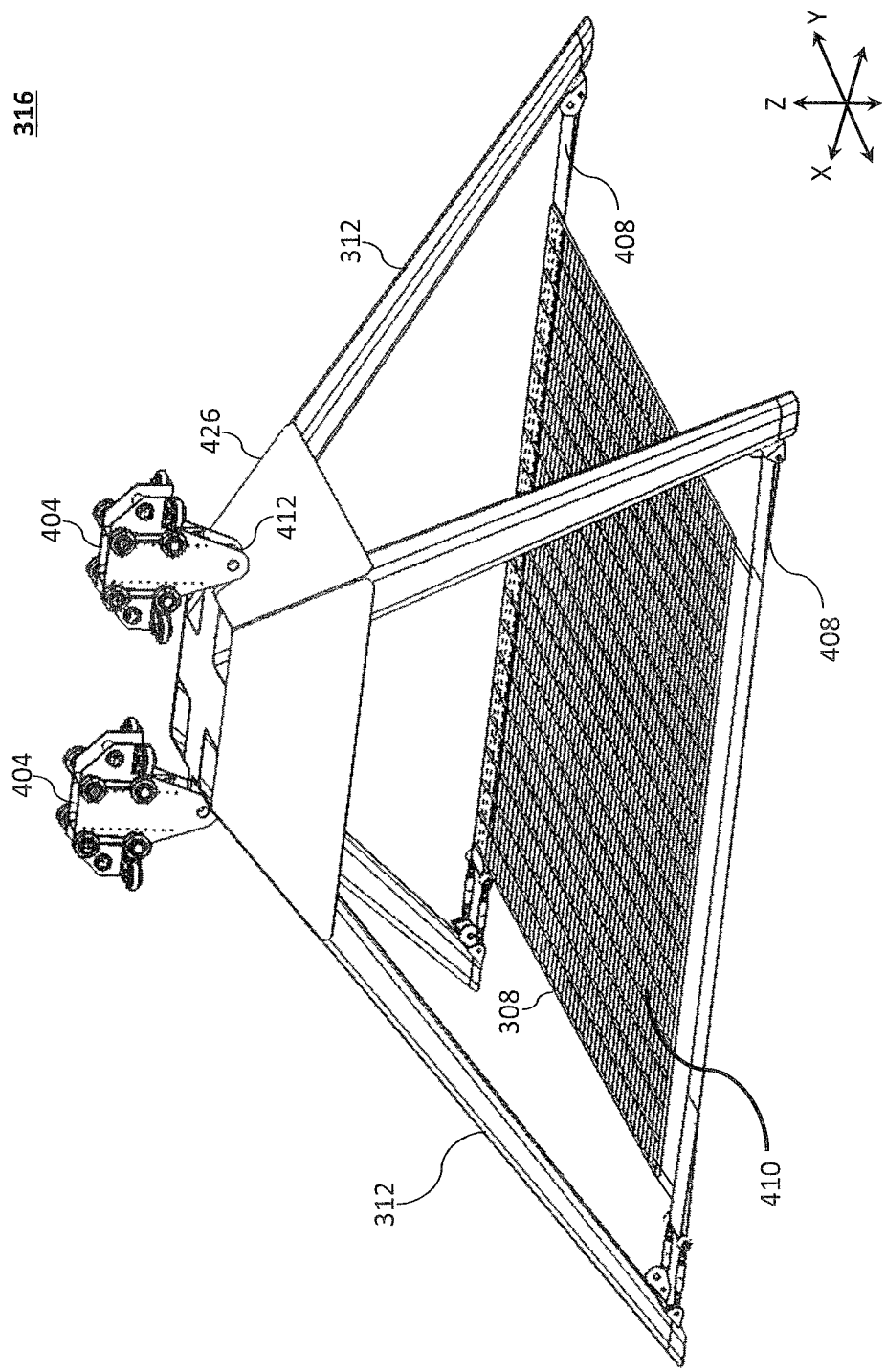
Figure 4D:
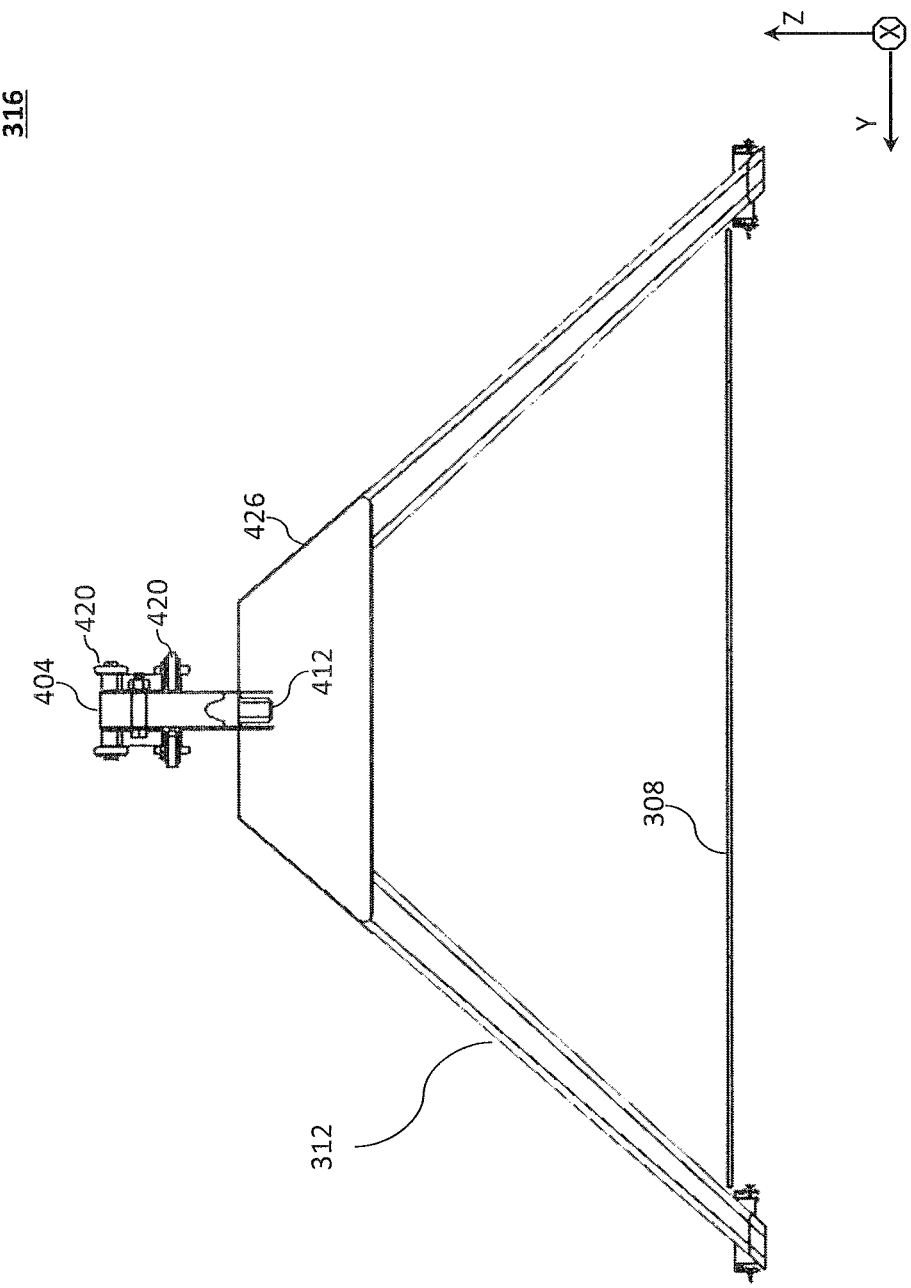
Figure 4E:
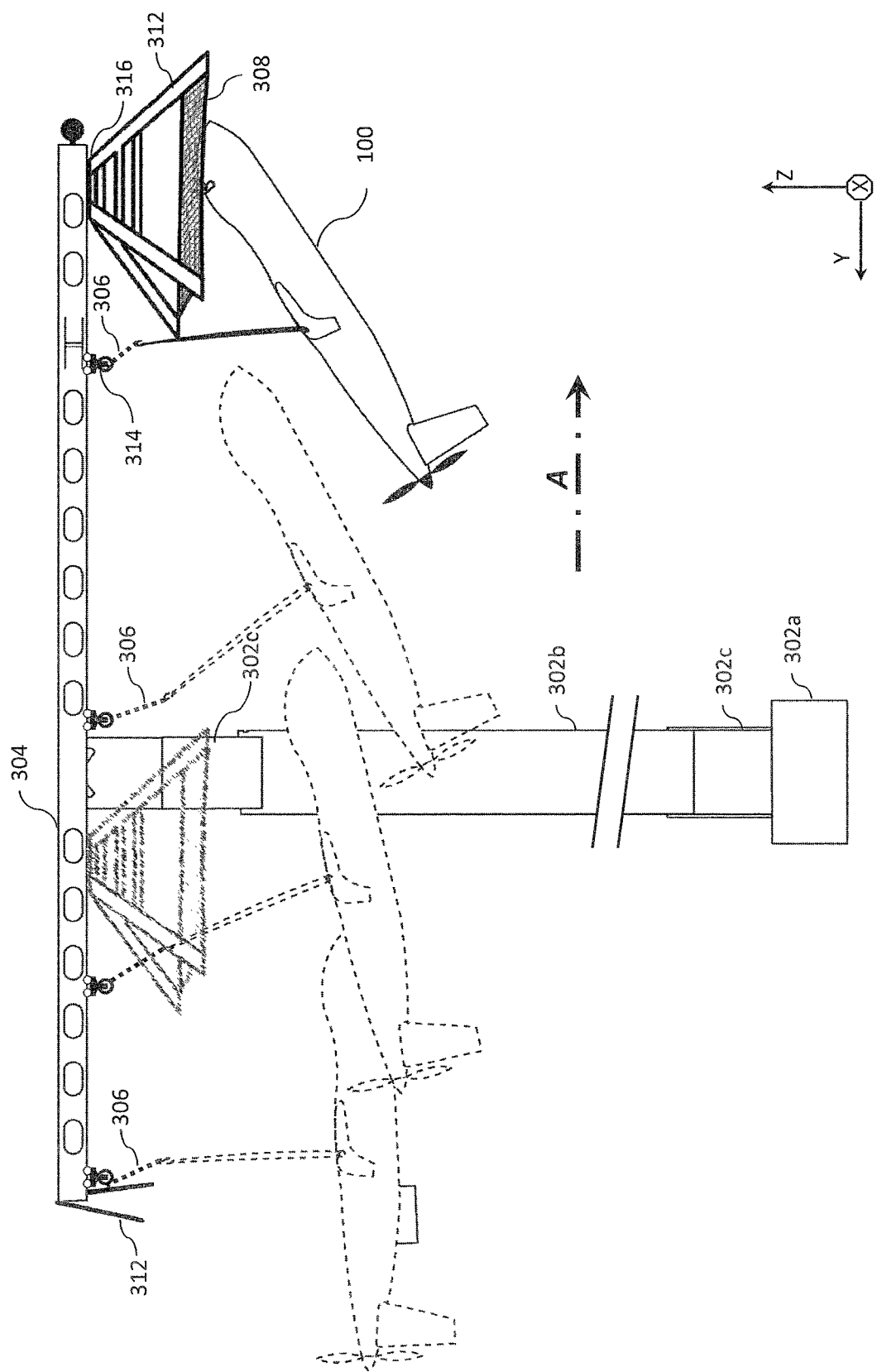
FIG. 4e illustrates a side view of a side-arm recovery system depicting an aircraft during various phases of recovery.

FIGS. 4a through 4d illustrate detailed views of the primary and secondary shuttles 314, 316 coupled to the rail 304, while FIG. 4e illustrates a side view of a side-arm recovery system 300 depicting an aircraft 100 during various phases of recovery (depicted using dotted lines) with the final (or near final) capture phase being depicted using solid lines. The primary shuttle 314 acts as a primary capture device, while the second shuttle 316 acts as a final capture device; thereby assisting in capturing and absorbing energy during capture of the aircraft 100. The primary shuttle and the secondary shuttle may be slideably coupled with the rail 304 via one or more techniques, including, for example, one or more tracks, wheels, ball bearings, chains, rope, etc. The primary and secondary shuttles 314, 316 may be configured to run on the outside race or the inside race of the rail 304, although benefits exist for external race for the primary and secondary shuttles 314, 316. The benefits include, inter alia, that the configuration provides additional protection from the environment (dirt, dust, seawater, and other contaminants) on the running surface where the shuttle contacts the rail. In certain aspects, the rail 304 may be adjusted in yaw to align with the wind. During capture, the arresting forces may predictably act approximately in the plane of symmetry through the side-arm recovery system's 300 central structure. Moreover, in shipboard operation, the aircraft's 100 momentum is preferably not directed at the ship's structure, thereby minimizing the risk of ship collision. Rather, the aircraft's 100 momentum could be directed over the water and, for example, parallel or adjacent to the longitudinal length of the ship's structure. However, directing the aircraft 100 at the ship's structure may be warranted depending on wind direction.

The primary shuttle 314 is preferably fabricated from lightweight materials because the primary shuttle 314 must be accelerated by the momentum of the aircraft 100 during capture. As best illustrate in FIG. 4b, the primary shuttle 314 generally comprises a chassis 404 having plurality of wheels 420 to run the primary shuttle 314 down the rail 304 and a sheave 406 (which may be coupled to the chassis 404 via a bolt 424a through a bolt holes 424b) to guide the arresting cable 306. In the illustrated example, the primary shuttle 314 may employ 12 wheels to keep the aircraft 100 aligned down the rail 304: 8 vertical wheels (two bottom and two top wheels per side—arranged in a square) and 4 horizontal wheels (located at the four corners of the shuttle). As can be appreciated, additional or fewer wheels may be used. For example, instead of two top wheels per side, a single top wheel may be used per side.

The arresting cable 306 may be connected to the primary shuttle 314 via the sheave 406 and stretched across a set of stanchions 312 (or anther downward-pointing structure) mounted at an angle to the rail 304 (or, where desired, the primary shuttle 314). The arresting cable 306 may be constructed from, for example, wire cable or rope (i.e., a type of rope which consists of several strands of metal wire laid into a helix) or synthetic cable/rope (e.g., a double braid polyester/polyester rope). As illustrated, the arresting cable 306 may be configured such that it is substantially taught and horizontal (e.g., horizontally stretched across the two stanchions 312). In other words, and as better illustrated in FIG. 7a, the arresting cable 306 may be substantially perpendicular to the boom portion 102a of the top-hook assembly 102 positioned on the aircraft 100 when stretched across the set of stanchions 312. The length or tautness of the arresting cable 306 may be controlled (e.g., let out/let in) using, for example, one or more winches coupled to, or integrated with the side-arm recovery system 300, such as a payout mechanism 416 and/or a deceleration mechanism 418.

The arresting cable 306 may rest upon the set of stanchions 312 until it is captured by the top-hook assembly 102. The pair of stanchions 312 may be spaced at a predetermined distance (e.g., about 6 inches) from the primary shuttle 314 on the rail 304. The pair of stanchions 312 may be spring loaded (e.g., using gas spring/dampers, pneumatic cylinder, etc.) such that they keep the arresting cable 306 taught and, upon capture, move up and outwardly from the rail 304 to mitigate risk of contact with the aircraft 100 (e.g., its empennage/propellers). As the arresting cable 306 pulls tight, it begins to slide up the boom portion 102a into the hook portion 102b at the end of the boom portion 102a. The arresting cable 306 is then captured in the hook portion 102b at the end of the boom portion 102a and remains there through capture.

Upon the hook portion 102b capturing the arresting cable 306, the arresting cable 306 is released from the pair of stanchions 312. That is, the boom portion 102a of the aircraft 100 pulls the arresting cable 306 free from the stanchions 312, and at the same time the arresting cable 306 begins to pull tight. To ensure that the stanchions 312 release the arresting cable 306 upon capture, the arresting cable 306 may be wrapped around angled cones positioned at the ends of the stanchions 312. When the aircraft 100 snags the arresting cable 306, it pulls the arresting cable 306 off of the cones. The angle of the cones is selected to ensure that the stanchions 312 both securely hold the arresting cable 306 and, at the same time, cleanly release the arresting cable 306 when the aircraft 100 captures it with its hook portion 102b. To that end, the interior cone angle may be between about 5 and 20 degrees, more preferably between 10 and 20 degrees, most preferably about 16 degrees. Testing demonstrated that the arresting cable 306 wrapped around a 16 degree cone did not come off too early, nor was it too difficult for the arresting cable 306 to be released during a capture attempt. More specifically, the arresting cable 306 repeatedly came off the stanchions 312 with a pull-force of approximately 10 lbs, which is acceptable. In certain aspects, a frangible component (e.g., a weak link, such as a string) may be used to secure the arresting cable 306 to the stanchions 312. In operation, the frangible component would keep the arresting cable 306 securely on the stanchions 312 in the event of disturbances such as wind or ship heave, but the frangible component would also break when the top-hook assembly 102 captured the arresting cable 306. The frangible component may be similarly configured to break with a pull-force of approximately 10 lbs.

Turning to FIG. 4c, the secondary shuttle 316 may further include a secondary capture device, or capture net 308, which may be used to catch aircraft 100 during capture. The capture net 308 may be stretched across two or more other stanchions 312 (e.g., four, as illustrated) mounted to the second shuttle 316. The secondary shuttle 316 may comprise an upper cap portion 426 and plurality (e.g., four) angled stanchions 312 aimed downward to define a pyramidal net support frame to secure and stretch the capture net 308 to defined a quadrilateral shape (e.g., a rectangle, as illustrated). The capture net 308 may be fabricated using a mesh 410 of steel cable having a diameter of ⅛ inch to ¼ inch, more preferably, about 3/16 inch. The capture net 308 may have smaller openings (e.g., smaller than the width of the forward fuselage hook's 106 barb) within the mesh 410 to create a higher probability of capture by the forward fuselage hook 106. The pyramidal net support frame may be coupled to the rail 304 via the secondary shuttle 316, which may include a chassis with a plurality of wheels to run the secondary shuttle 316 down the rail 304 (akin to that described with regard to the primary shuttle 314). For example, as illustrated, the secondary shuttle 316 may include two chassis 404 (each having plurality of wheels 420), but coupled to the pyramidal net support frame in lieu of the sheave 406 (e.g., using the same bolt 424a through a bolt holes 424b). The upper cap portion 426 of the pyramidal net support frame (i.e., where the stanchions 312 converge) may be removable coupled to the chassis via an attachment device 412, through which a fastener (e.g., a pin, the bolt 424a, eye, etc.) may pass.

The capture net 308 may be used to reduce or eliminate post-capture motion and to aid in deck handling. Accordingly, following the arrest, the aircraft 100 may be suspended the arresting cable 306 and the capture net 308, thereby allowing for minimal lateral and/or longitudinal movements. Another purpose of the secondary shuttle 316 is to prevent the aircraft 100 from striking the rail 304 during capture, where the deceleration rate of the aircraft 100 is typically 8 Gs. Due to the angle of the arresting cable 306 with respect to the aircraft 100, there is an upward component (as best illustrated in FIG. 4e) to the force applied to the aircraft 100, which may be 0.3 to 0.6 times the deceleration rate. To further mitigate the risk of the aircraft 100 striking the rail 304, the secondary shuttle 316 may also employ a plurality of straps 408 that run longitudinally and are attached to the ends of the stanchions 312 on the secondary shuttle 316. As the aircraft is heaved upwards during capture, the straps 408 can interface with the aircraft's 100 wing roots to provide a downward force that prevents the aircraft 100 from hitting the rail 304.

In certain aspects, the capture net 308 may raise or lower relative to the rail 304 to aid in retrieval of the aircraft 100. For example, the net assembly (e.g., the capture net 308 and the net support structure) may be coupled to the secondary shuttle 316 via a cable and a winch. Alternatively, as will be discussed, the entire rail 304 (along with the secondary shuttle 316 and aircraft 100) may be lowered via the articulating arm 302 to bring the aircraft 100 to the ground.

As illustrated in FIG. 4e, in operation, the primary shuttle 314 travels along the rail 304 in the direction of the aircraft's 100 path (i.e., Direction A). During arresting (i.e., capture), the primary shuttle 314 may be entrained by the aircraft 100 (e.g., via the top-hook assembly 102) through the arresting cable 306. For example, the top-hook assembly's 102 hook portion 102b, whether retractable or not retractable, initially engages the arresting cable 306 strung across the pair of stanchions 312, typically at a point midway up the boom portion 102a. The aircraft's kinetic energy may be transferred into the primary shuttle 314 via the arresting cable 306, which may then be transferred into the secondary shuttle 316 via the arresting cable 306 to accelerate the primary shuttle 314 and the secondary shuttle 316 to match the velocity of the aircraft 100. The aircraft's 100 kinetic energy then may be dissipated through the arresting cable 306 by a deceleration mechanism 418 coupled to the articulating arm's 302 structure. Thus, the capture loads are transmitted through the articulating arm 302 and into a ship or the ground. During the final stage of capture, the capture net 308 may ensnare the forward fuselage hook 106 positioned toward the nose (e.g., at the top or bottom of the fuselage 104) of the aircraft 100. When both the top hook assembly 102 and forward fuselage hook 106 are engaged, the aircraft 100 may be in a pitched up, substantially horizontal position.

The aircraft 100, which is flying at higher speeds (e.g., up to 80 kts), must interface with components of the side-arm recovery system 300 that are initially stationary. The arresting cable 306 is the first component that must be accelerated, but its low mass does not impart significant loads into the aircraft. Two other components, namely the primary and secondary shuttles 314, 316, do have significant mass, and the inertial loads of these components must be attenuated using, for example, a payout mechanism 416 and/or a deceleration mechanism 418.

The payout and deceleration mechanisms 416, 418 may include, for example, a pulley system (e.g., 20:1 ratio, 12:1 ratio, etc.), one or more cylinders, and a plurality of relief valves. The payout and deceleration mechanisms 416, 418 may employ a constant force slip clutch such that, when a cable is pulled, nothing happens until a predetermined cable tension is achieved. Once the cable tension reaches the predetermined cable tension, the constant force slip clutch allows cable to be released mechanism while maintaining a constant cable tension, which is independent of cable speed. If the tension in the cable is reduced below the set point, no more cable is released, nor does the mechanism attempt to reel back any of the cable. Preferably, the constant force slip clutch does not result in any variation in cable tension with the acceleration rate of the cable, or the amount of cable released. While a friction type clutch is acceptable, a hydraulic cylinder with a pressure relief valve mounted to the cylinder is preferred. The cylinder would be attached to a pulley system, where pulling on the cable compresses the cylinder to cause the pressure in the cylinder to rise until it reaches the pressure relief value set point. At this point, the valve opens and maintains the pressure in the cylinder at the set point. This constant pressure results in a constant cable tension. Once the cable tension is reduced, the pressure reduces and the valve closes. Since the fluid in the cylinder is essentially uncompressible, the cylinder does not attempt to reel in any off the released cable. In certain aspects, the payout and deceleration mechanisms 416, 418 may employ, for example, a winch coupled with one or more shock absorbers, water twisters, springs (linear or torsional), elastic cables, or hydraulics (e.g., accumulators).

FIGS. 5a through 5d illustrates a schematic view of example cabling arrangements for the side-arm recovery system 300, certain of which may have attenuation devices, such as a payout mechanism 416 and/or a deceleration mechanism 418. FIGS. 5a through 5d demonstrate how the aircraft 100 accelerates the primary and secondary shuttles 314, 316 via a plurality of cables, including the arresting cable 306, the payout cable 504, the deceleration cable 510, and the inter-shuttle cable 502. The payout cable 504 connects the payout mechanism 416 to the arresting cable 306. The deceleration cable 510 connects the deceleration mechanism 418 to the primary shuttle 314. The arresting cable 306 is the cable that connects the aircraft 100 to the side-arm recovery system 300. That is, the arresting cable 306 starts at the aircraft 100, wraps around the rail 304 via one or more pulleys, and terminates at the secondary shuttle 316. Finally, the inter-shuttle cable 502 connects the secondary shuttle 316 to the primary shuttle 314.

With reference to FIG. 5a, the arresting cable 306 may be coupled to the primary shuttle 314 via a sheave 406 (e.g., a pulley), which is ultimately coupled to the secondary shuttle 316 via one or more pulleys 414. To mitigate kinking and reduce friction, the arresting cable 306 may be threaded through one or more pulleys 414, each of which may employ bushings, ball bearings (e.g., a double-row cylindrical roller bearing), etc. The pulleys 414 may further include one or more cable guards to prevent a cable from derailing (i.e., falling out of the pulley's channel). For example, a primary pulley 414a may be positioned at each end of the rail 304 to route the arresting cable 306 (or portions thereof) around the ends of the rail 304.

To maintain a predetermined spacing between the primary and secondary shuttles 314, 316 during capture, one end of the arresting cable 306 may be coupled to the primary shuttle 314, while the other end of the arresting cable 306 may be threaded through the set of primary pulleys 414a and around the rail 304 (e.g., along the top side of the rail 304) before coupling with the secondary shuttle 316. To adjust the tension of the arresting cable 306, the distance between the set of primary pulleys 414a may be adjusted. For example, one or more actuated may be provided in or on the rail 304 to displace each of the primary pulleys 414a relative to the rail 304, where an increased distance results in higher tension, and a reduced distance results in lower tension (i.e., more slack). The inter-shuttle cable 502 may be coupled between the primary and secondary shuttles 314, 316. The arresting cable 306 and inter-shuttle cable 502 may be constructed from, for example, a wire cable/rope or a synthetic cable/rope. Each of the primary shuttle 314 and the secondary shuttle 316 may include one or more cable attachment devices 402 (e.g., loops, fork devises, bolts to couple with cable terminals eyes, etc.) to couple with cables, such as the arresting cable 306 and the inter-shuttle cable 502.

During the initial angular momentum exchange, the arresting cable 306 may be payed out from the primary shuttle 314 to reduce loads on the aircraft 100, but once that is complete, the arresting cable's 306 length remains essentially fixed. The primary shuttle 314 may serve to control the length and angle of the arresting cable 306 from the rail 304 to the aircraft 100 via the sheave 406. As the aircraft 100 moves from left to right in the figures, the hook portion 102b pulls on the arresting cable 306, which runs over a sheave 406 coupled to the primary shuttle 314 and around the primary pulleys 414a at each end of the rail 304 prior to connecting to the secondary shuttle 316. The sheave 406 prevents the angle that the arresting cable makes with the aircraft from becoming too shallow as the aircraft 100 moves down the rail 304. Additionally, the arresting cable 306 must continually pay out throughout the capture event. This shallowing and lengthening of the arresting cable 306 afforded by the sheave 406 mitigates heave and reduces back-to-center restoring force for captures with some lateral error—each of which being undesirable. That is, the primary shuttle 314 follows the aircraft 100 down the rail 304, thus the angle between the arresting cable 306 and the rail 304 remains constant along with arresting cable's 306 length. In another embodiment, an example of which is illustrated in inset A, the arresting cable 306 may be segmented and coupled to one another via an intermediate structure, such as the primary shuttle 314.

Figure 5B:
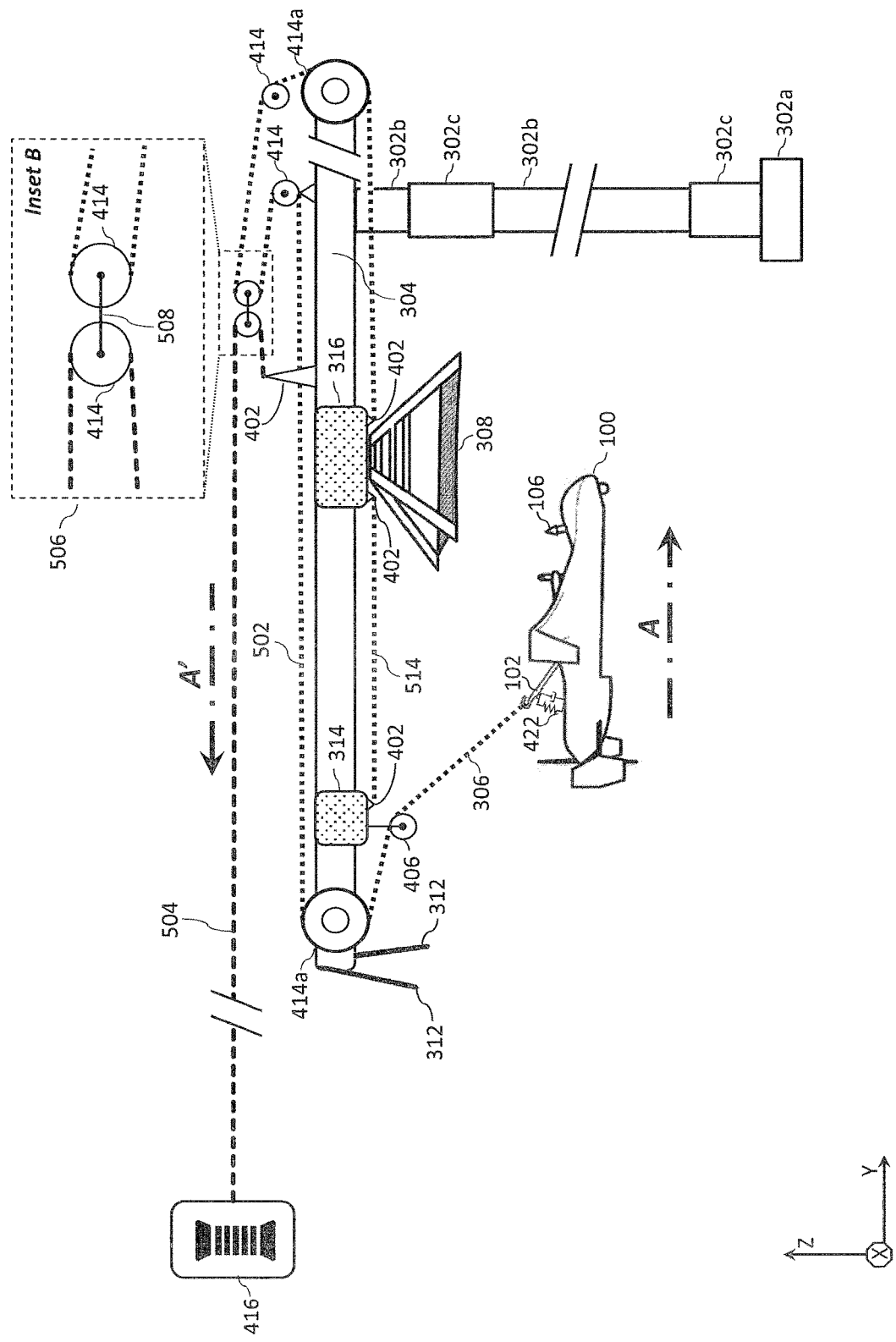

With reference to FIG. 5b, a first cable management device (e.g., a payout mechanism 416) may be introduced to manage the length and tension of the arresting cable 306. The arresting cable's 306 compliance is not enough to attenuate the load resulting from capture of the aircraft 100. Therefore, the payout mechanism 416 pays out a payout cable 504 when the loads in the arresting cable 306 are above a predetermined load threshold (trigging the clutch) to attenuate the internal loads applied to the aircraft 100 when accelerating the primary and secondary shuttles 314, 316. The payout mechanism 416 may couple with the arresting cable 306 via a payout cable 504 and a dual pulley assembly 506. The payout mechanism 416 may be positioned on the rail 304, or elsewhere in the side-arm recovery system 300, such as the base 302a of the articulating arm 302. The payout mechanism 416 is preferably placed at the downstream end of the rail 304 to allow for the full rail length of payout cable 504 to be used as the 'spring' to attenuate inertial loads. For example, a long spring yields more compliance, therefore a rope with a modulus may not be required.

The payout mechanism 416 provides a constant tension to the arresting cable 306, which can be augmented by a shock absorber to absorb energy. For example, the payout mechanism 416 may serve to limit forces created during deceleration in the arresting cable 306 after arrest to allow uniform acceleration of both the primary and secondary shuttles 314, 316. When the payout mechanism 416 is paying out payout cable 504, the distance between the primary shuttle 314 and the aircraft 100 increase; although it is desirable to minimize this distance, as a shorter distance results in a smaller dispersion area in terms of where the aircraft 100 will end up relative to the secondary shuttle 316. The amount of payout cable 504 may be determined as a function of: the relative mass between the aircraft 100 and the primary and secondary shuttles 314, 316, the speed of the aircraft 100, and the maximum deceleration force. For example, a larger aircraft to shuttle mass ratio is preferred as less payout cable 504 will be payed out since less momentum must be exchanged. Additionally, a slower aircraft 100 will require less momentum to be exchanged as the primary and secondary shuttles 314, 316 will be accelerated to a slower speed. Finally, the higher the acceptable deceleration force, the less payout cable 504 needed to pay out as the primary and secondary shuttles 314, 316 themselves can be accelerated faster. Once the primary and secondary shuttles 314, 316 and the aircraft 100 match speeds, the payout mechanism 416 stops paying out payout cable 504 as the effective force needed to accelerate the primary and secondary shuttles 314, 316 is zero, and thus the cable tension drops close to zero.

As illustrated in the inset B, the dual pulley assembly 506 may include a set of pulleys 414 joined to one another via its axels (pivot points) using a linkage bar 508. The dual pulley assembly 506 in effect couples the payout cable 504 to the arresting cable, while still allowing them to travel relative to one another (through rotation of the pulleys 414). The payout cable 504 is coupled at a first end to the payout mechanism 416, while being fixedly coupled at a second end to the rail 304. In operation, the payout mechanism 416 can selectively control (e.g., drawing in or paying out) an amount of payout cable 504 to maintain a predetermined tension on the arresting cable 306. That is, drawing in an amount of payout cable 504 at the payout mechanism 416 causes the dual pulley assembly 506 to travel in Direction A', thereby pulling and increasing the tension on the arresting cable 306. Conversely, paying out an amount of payout cable 504 at the payout mechanism 416 causes the dual pulley assembly 506 to travel in Direction A, thereby introducing slack and decreasing the tension on the arresting cable 306.

Figure 5C:
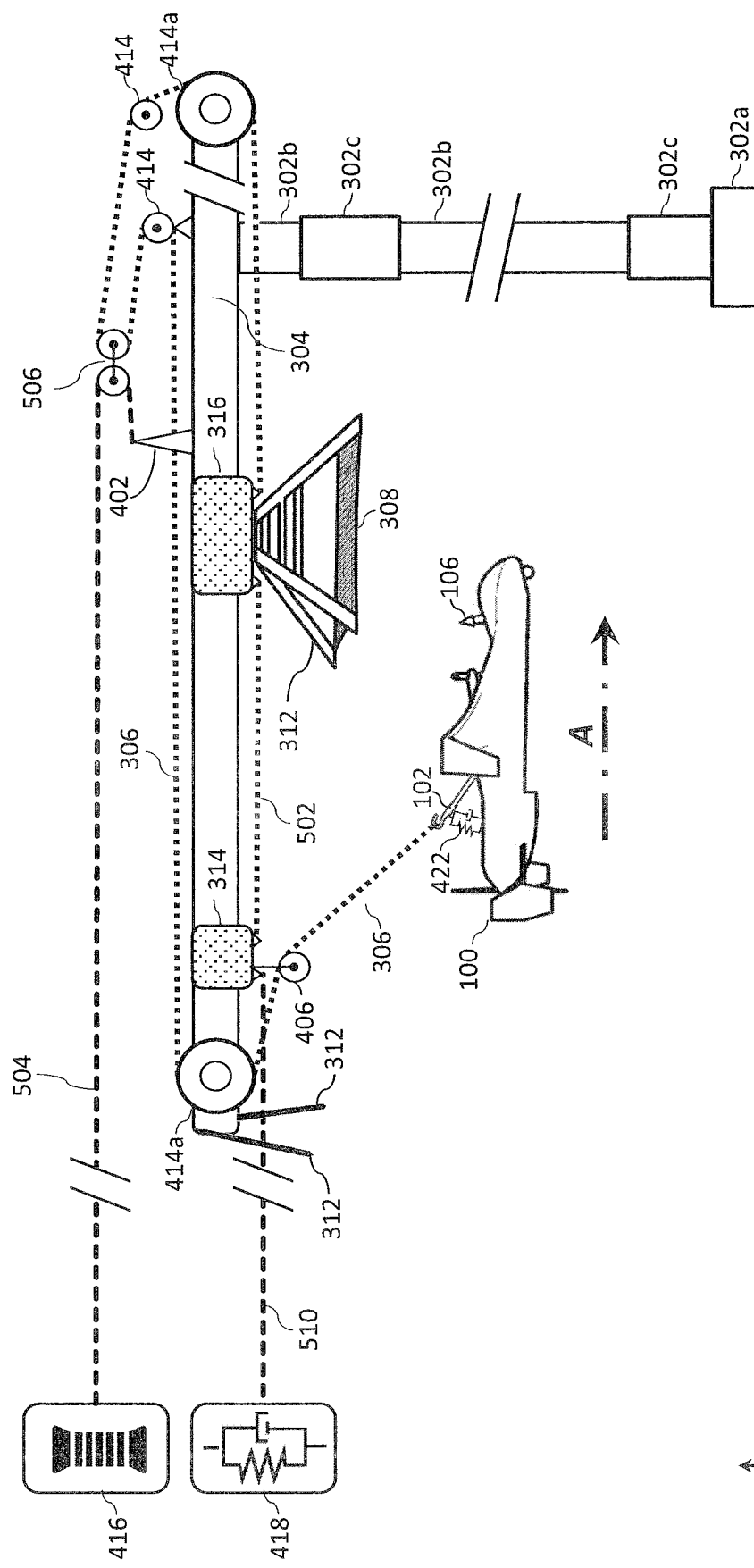

Turning to FIG. 5c, a second cable management device (e.g., a deceleration mechanism 418) may be introduced to deaccelerate or dampen the aircraft 100 and shuttles 314, 316. Once the aircraft 100 and shuttles 314, 316 are moving down the rail 304 at the same speed, there is effectively no force on the aircraft 100 and shuttles 314, 316. At this point, the side-arm recovery system 300 must begin decelerating the aircraft 100 and shuttles 314, 316 as a single unit.

The deceleration mechanism 418 need not be connected to the aircraft 100 or the arresting cable 306 directly, but rather, may be coupled to the primary shuttle 314 using a deceleration cable 510 (e.g., via cable attachment devices 402). The load path that decelerates the aircraft 100 may therefore be through the primary shuttle 314, through the arresting cable 306 to the secondary shuttle 316, through the secondary shuttle 316, through the arresting cable 306, and the payout mechanism 416 around to aircraft. The tension in the cable decreases as one moves away from the deceleration mechanism 418, as each component in line has its own inertial force. Therefore, the load in the deceleration mechanism 418 itself may be, and is, higher than the payout set-point, but as long as the arresting cable tension is less than the set point at the payout mechanism 416, no deceleration cable 510 is payed out. As this is the point in the recovery process where the aircraft is entering and is in contact with the secondary shuttle, relative motion between the two must be mitigated. Therefore, the deceleration set point should be set in such a way that the tension in the payout mechanism 416 is less than the payout set point.

To minimize the cable diameter and weight, each of the inter-shuttle cable 502, the payout cable 504, and the deceleration cable 510 may be fabricated from a high strength rope, which may also be high modulus. A high modulus cable or rope that is lighter than the arresting cable 306 reduces the mass of the payout cable 504 and enables use of smaller pulleys 414, thereby reducing the overall inertia and reducing the amount of inertia that the arresting cable 306 must attenuate. For example, a ⅜ to 1 inch diameter (or, more preferably, a 9/16 inch diameter), single-braid, 12 strand, ultra-high-molecular-weight polyethylene (UHMWPE) rope may be used. A UHMWPE rope is stronger than steel cable of the same diameter, but light enough that it floats on water.

Figure 5D:
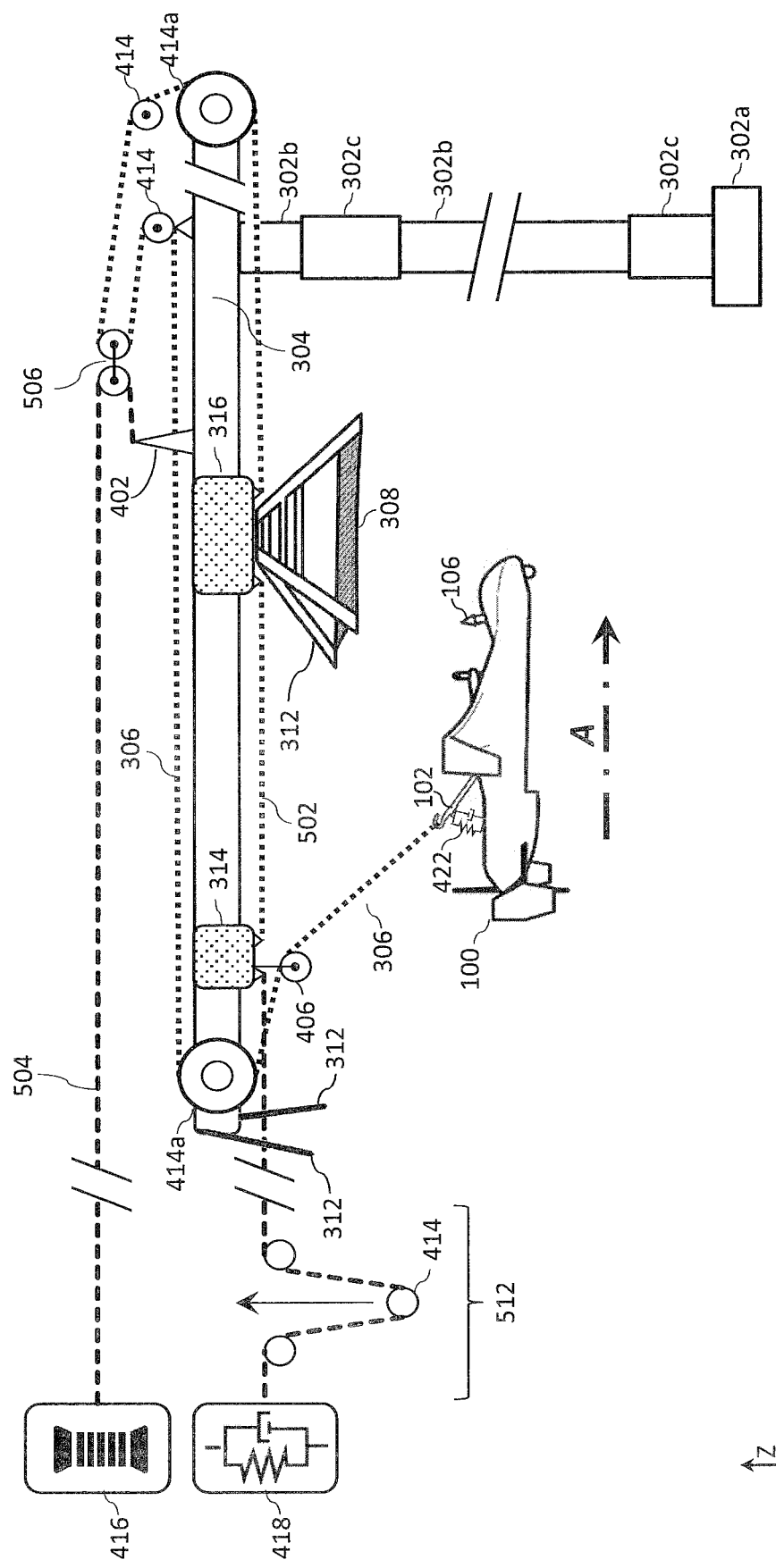

With reference to FIG. 5d, a cable slack-keeper system 512 may be introduced to provide a loop (additional portion) of extra deceleration cable 510 that can be introduced to the deceleration mechanism 418. An objective of the cable slack-keeper system 512 is to delay the onset (e.g., delay engagement) of the deceleration mechanism 418. There are two loops in the system to allow for a greater amount of slack to be payed out without the need for one long rail. The overall concept is that the shuttles and pulleys pull down on the arresting cable 306 that is strung across the system. When the primary shuttle stars moving down the rail, it pulls on these loops of rope that are only held taught by a predetermined force (e.g., 101b). Once the slack is pulled out of the system, the rope is essentially straight and none of the very large cable loads are applied to this system.

During the payout stage/acceleration of the primary and secondary shuttles 314, 316, a goal is to accelerate the primary and secondary shuttles 314, 316 as fast as possible. If the deceleration mechanism 418 is engaged, however, the primary and secondary shuttles 314, 316 may not achieve aircraft speed. Therefore, the deceleration mechanism 418 must effectively be taken off-line until the primary and secondary shuttles 314, 316 and aircraft 100 are matched. In operation, the speed and mass of the aircraft 100 are known before capture, while the time to accelerate the primary and secondary shuttles 314, 316 can be determined. It is therefore possible to calculate the position on the rail 304 that the primary and secondary shuttles 314, 316 will positioned when they reach the same speed as the aircraft 100. Accordingly, a similar amount of slack is put into the deceleration cable 510 that is connected to the deceleration mechanism 418, but it is also acceptable to introduce extra slack into the system. If the primary and secondary shuttles 314, 316 come up to speed early, the system (i.e., the primary and secondary shuttles 314, 316 and aircraft 100) can coast down the rail 304 until all of the slack is taken out of the cable slack-keeper system 512. In certain aspects, the starting position of the deceleration mechanism 418 and cable slack-keeper system 512 parameters, along with other aircraft specific parameters, can be automatically set prior to capture.

The deceleration mechanism 418 may provide an arresting cable 306 tension augmented by a shock absorber (e.g., hydraulic accumulator). Moreover, the deceleration mechanism 418 may reel in (or let out), with the use of a cable slack-keeper system 512, the arresting cable 306 thereby enabling both the primary shuttle 314 and the secondary shuttle 316 to slide along the rail 304 at the same time and speed. The cable slack-keeper system 512 may put slack into the arresting cable 306 to delay the deceleration mechanism 418 until the primary shuttle 314 and the secondary shuttle 316 are accelerated to the same velocity as the aircraft 100.

Figure 6:
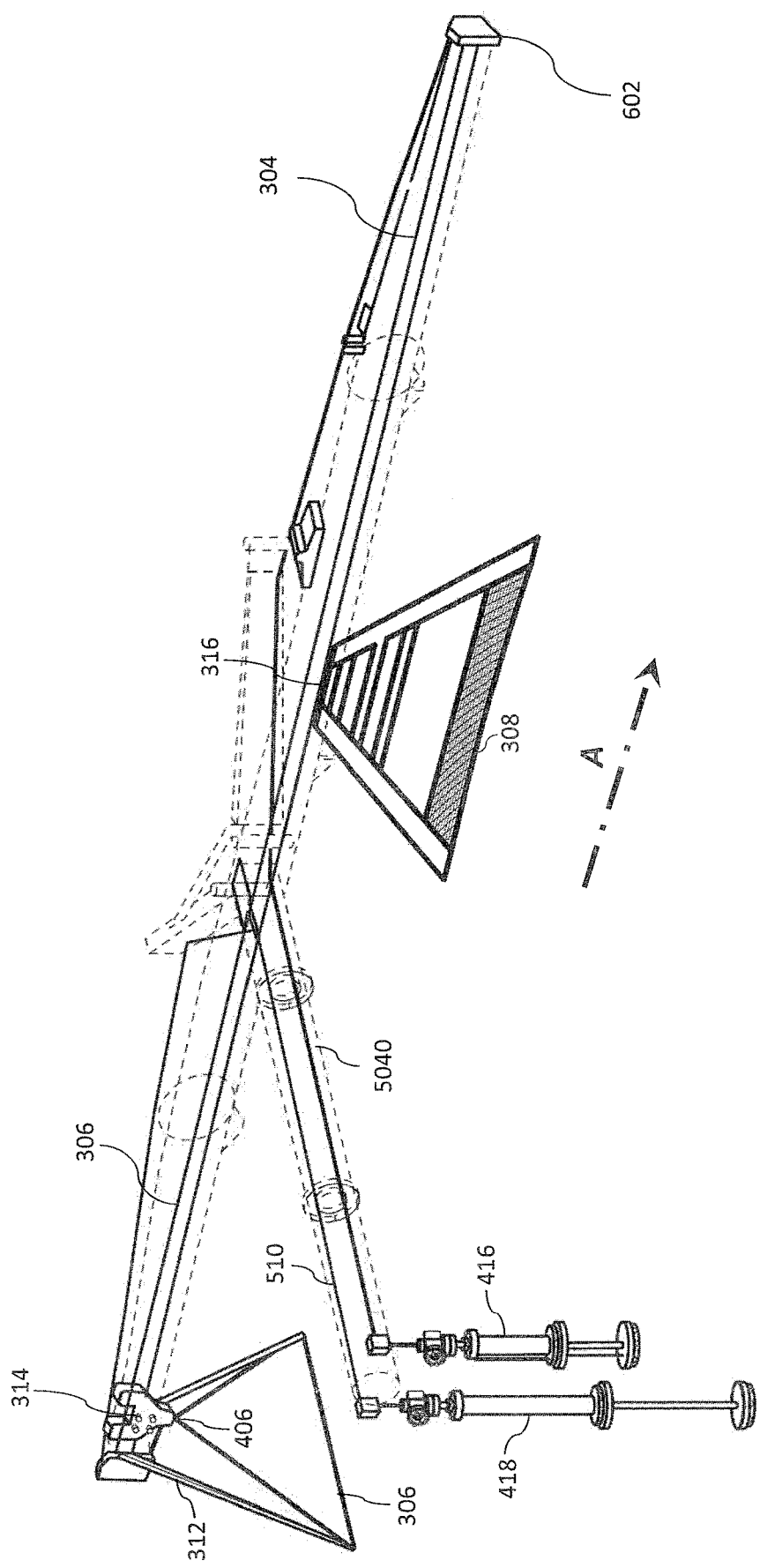
FIG. 6 illustrates an rear isometric view of the side-arm recovery system with a payout mechanism and deceleration device.

FIG. 6 illustrates an isometric view of the side-arm recovery system 300 with a payout mechanism and deceleration device. In operation, the aircraft 100 may ensnare the arresting cable 306 during capture. The primary shuttle 314 and the secondary shuttle 316 may accelerate to match the speed of the aircraft 100 through the arresting cable 306. The deceleration mechanism 418 may be then configured to decelerate the aircraft 100 once both the primary shuttle 314 and the secondary shuttle 316 match the velocity of the aircraft 100. The deceleration loads within the aircraft recovery system may be designed to be less than the payout mechanism's 416 loads to prevent the payout mechanism 416 from activating during the deceleration of the aircraft 100. The payout mechanism 416 may attenuate the inertial loads experienced by both the primary shuttle 314 and the secondary shuttle 316 by letting out, or pulling in wire cable/rope or synthetic cable/rope that is coupled to the arresting cable 306. Once the aircraft 100 is ensnared by the arresting cable 306, decelerated by the deceleration device, and the payout mechanism maintains inertial loads under a safe threshold, the aircraft will pull both the primary shuttle 314 and the secondary shuttle 316 along the rail 304 until the arresting cable 306 heave the aircraft upward into the capture net 308.

While the described side-arm recovery system 300 is designed to accommodate an aircraft 100 in the 1,200 lb plus gross weight category to provides a useful range and payload, the side-arm recovery system 300 is flexible and may be sized to recover aircraft ranging from 400 lb to 4,000 lb and up. Indeed, the structural sizing of the side-arm recovery system 300 (e.g., net size, rail cross section and length, rope diameter, etc.) can be adjusted to meet specific mission specifications. Preferably, there is a range of weights and aircraft velocities we can accommodate for any given size, but there are limits (e.g., the side-arm recovery system 300 designed to capture a 4,000 lb aircraft may not be best suited for a 400 lb aircraft). Indeed, peak loads imparted into the aircraft are driven by the inertia of the shuttles, rope, and other dynamic components during the initial part of the capture when they exchange momentum with the aircraft, which means that in order to minimize those loads by sizing the side-arm recovery system's 300 components to be just large enough to handle the capture loads, while minimizing their inertia. Indeed, the side-arm recovery system 300 may be sized as a function of aircraft 100 weight and flight speed at capture. For example, a side-arm recovery system 300 sized for an aircraft 100 weighing 1,200 lb and a velocity of 65 kt can works reasonably well with a 440 lb aircraft traveling at 75 kt. However, where a system is designed above that range, the lighter aircraft would be exposed to higher inertial loads due to the increased size of the shuttles, rope, etc. to handle the larger aircraft. At some point those higher inertial loads will damage the lighter aircraft or force that aircraft to add mass in the form of structure to survive.

The arresting cable 306 tension, payout mechanism 416, and deceleration mechanism 418 may be used to determine the maximum deceleration of the aircraft 100 during capture. For example, a higher force and damping yields an increase in the deceleration of the primary shuttle 314 and the secondary shuttle 316 and the aircraft 100. In turn, a lower force and damping will result in a decrease in the deceleration of the primary shuttle 314 and the secondary shuttle 316 and the aircraft 100. Accordingly, a longer rail 304 may be required with lower force and damping. The cable tension and shock absorbers determine the deceleration of the aircraft together with the cable pay-out length which defines the arresting envelope.

To prevent the both the primary shuttle 314 and the secondary shuttle 316 from sliding off the end of the rail 304, a dead stop device may be used to limit forward travel range (Direction A) along the rail 304. For example, the deceleration mechanism 418 may lock once a predetermined amount of arresting cable 306 has been let out, thus stopping both the primary shuttle 314 and the secondary shuttle 316 from traveling beyond the end of the rail 304. Moreover, a protruding peg or cap 602 may be positioned toward the end of the rail 304 to prevent both the primary shuttle 314 and the secondary shuttle 316 from sliding off the end of the rail 304. Alternatively, a safety mechanism may permit the shuttles and air vehicle to slide off the rail 304 to prevent excessive loads on the ship if the capture energy is too high (excessive velocity).

Figure 7A:
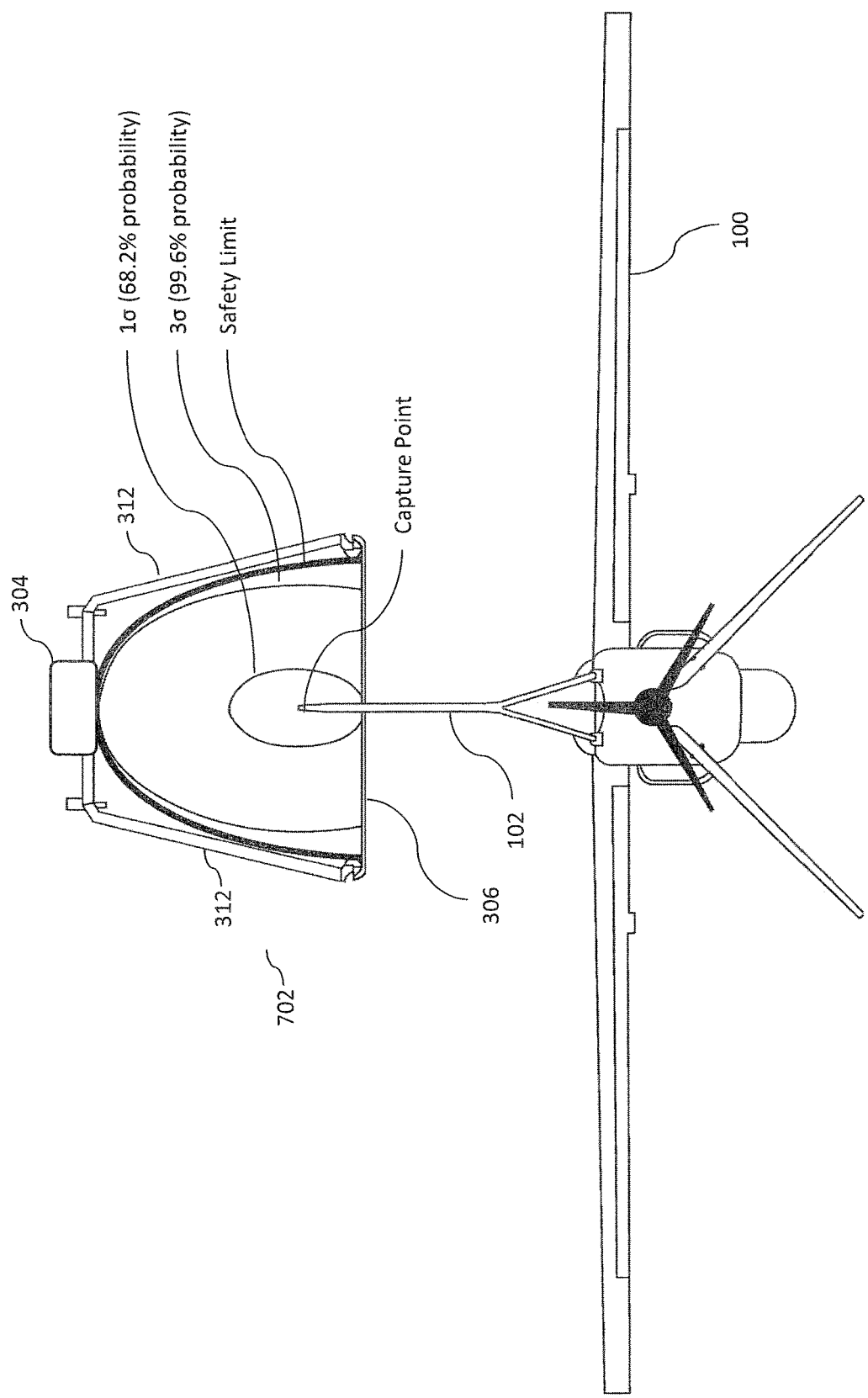
FIG. 7a illustrates a rear alignment view of an aircraft during descent into a shuttle with its top-hook assembly in the extended position.

FIG. 7a illustrates a rear view of an aircraft 100 during descent into a set of two stanchions 312 with its top-hook assembly 102 in the extended position. The recovery trapeze 702 formed by the set of two stanchions 312 and the arresting cable 306 may ensure a greater than 3-σ probability (99.6% probability) of missing recovery system structure and a greater than 1-σ probability (68.2% probability) of capture. Naturally, the probability of capture and impact may be tuned for new applications as desired by a designer/operator. Less than 1 meter 1-σ accuracy can be achieved consistently using Real Time Kinematic ("RTK") Global Positioning System ("GPS") or other forms of differential GPS, even in the presence of ship motion, winds, and turbulence off the ship's deck. The recovery trapeze 702 may be configured so that the 3-σ boundary for the arresting hook position at the end of the top-hook assembly 102 falls within the outline of the set of two stanchion's 312 frame. Thus, a target point may be situated above the arresting cable 306 in a biased position in order to guarantee greater than 1-σ capture probability because the set of two stanchions 312 is positioned over, for example, water. Thus, all low misses result in a safe go-around. High-bandwidth flaps may be used as direct lift-control effectors to reduce vertical tracking errors. This allows the set of two stanchions 312 capture envelope to be reduced in size. The flaps may increase or decrease the wing lift to reduce tracking errors. In certain aspects, the rail 304 or articulating arm 302 may be configured with a mast for installation of line-of-sight ("LOS") communications antennas. The elevated position of the top of the recovery system structure provides enhanced field of regard with reduced obstructions relative to other mounting alternatives.

Figure 7B:
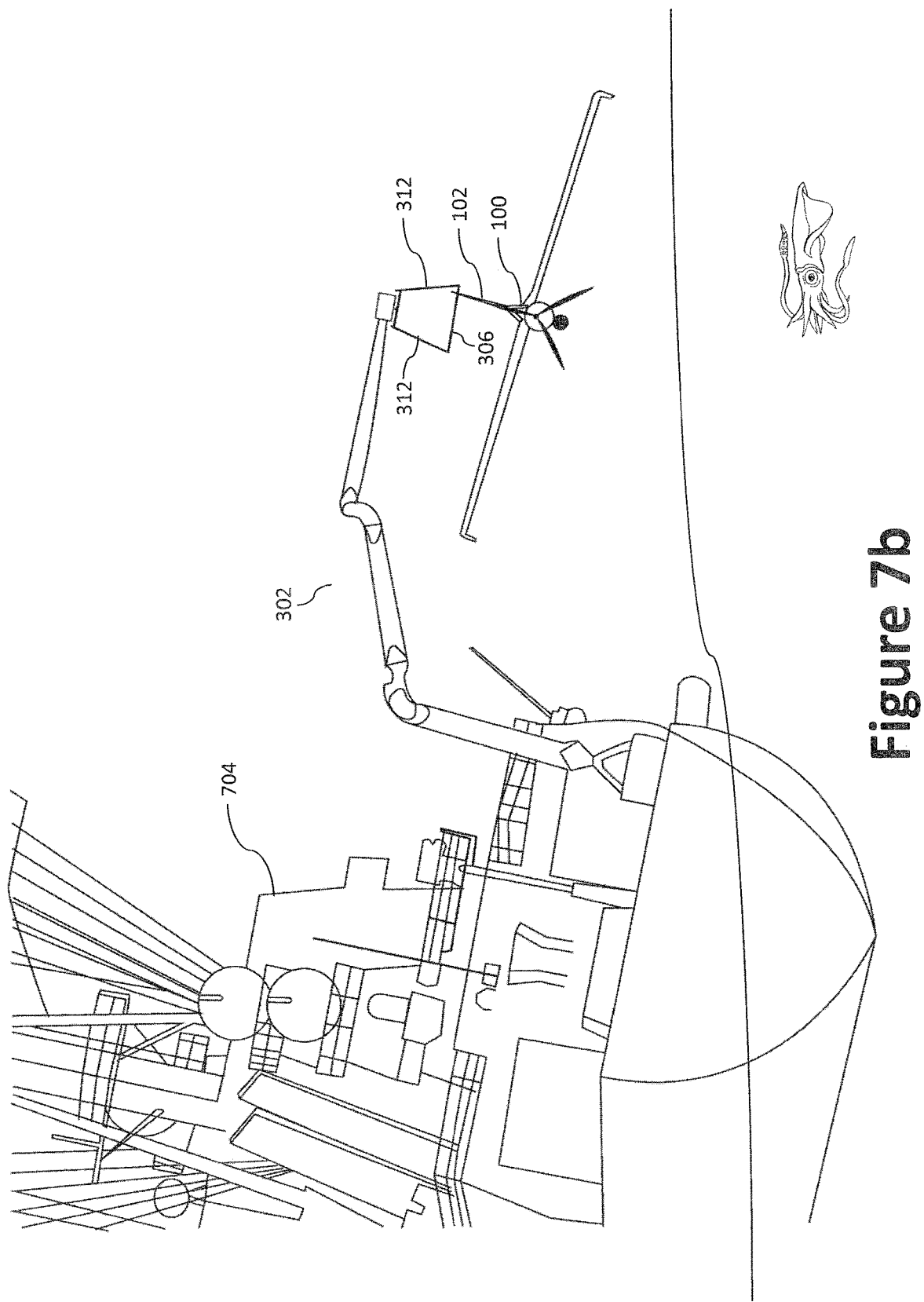
FIG. 7b illustrates a shipboard, side-arm recovery system in high sea states.

In shipboard operation, the articulating arm 302 may hold the rail 304 and both the primary shuttle 314 and the secondary shuttle 316 over the side of the ship 704 (e.g., a naval ship) such that the aircraft's 100 direction of travel is substantially parallel to the ship's longitudinal length. Using this configuration, the risk of crashing the aircraft 100 into the ship 704 is greatly reduced because the aircraft 100 is not flying towards the ship's structure, but rather, alongside. As illustrated in FIG. 7b, the side-arm recovery system 300 may be designed to operate in high sea states (6-7). In oceanography, a sea state is the general condition of the free surface on a large body of water—with respect to wind waves and swell—at a certain location and moment. During a sea state the end of the articulating arm 302 distal from the ship 704 may experience height fluctuations form the capture point of the articulating arm 302 and the water. This creates a moving target for the aircraft 100. The articulating arm 302 may employ a controls algorithm to compensate for such movement and render the capture point of the articulating arm 302 stationary from the perspective of the aircraft 100 and thus, increasing the probability of capture.

The scenario of FIG. 7b involves 10 degrees ship roll and 6 degrees ship pitch with waves reaching 8 feet above the nominal sea surface. The articulating arm's 302 sizing criterion may be chosen such that a minimum clearance (e.g., 1 to 40 feet, more preferably 5 to 30 feet, most preferably at least 10 feet) between the inner wingtip of the aircraft 100 and all elements of the ship 704 and articulating arm 302 is required under the most critical conditions. This criterion may be used to determine the lengths of the articulating arm 302 elements for a particular aircraft 100. The overall height of the articulating arm 302 may be determined by allowing sufficient clearance from the outer wingtip to the highest wave height while in a 20-degree roll away from the ship 704. The size of the side-arm recovery system 300 may be driven by ship 704 geometry, ship orientation, wave height, keep-out zones, and aircraft clearance margins from the ship, water, and recovery system structure.

Figure 7C:
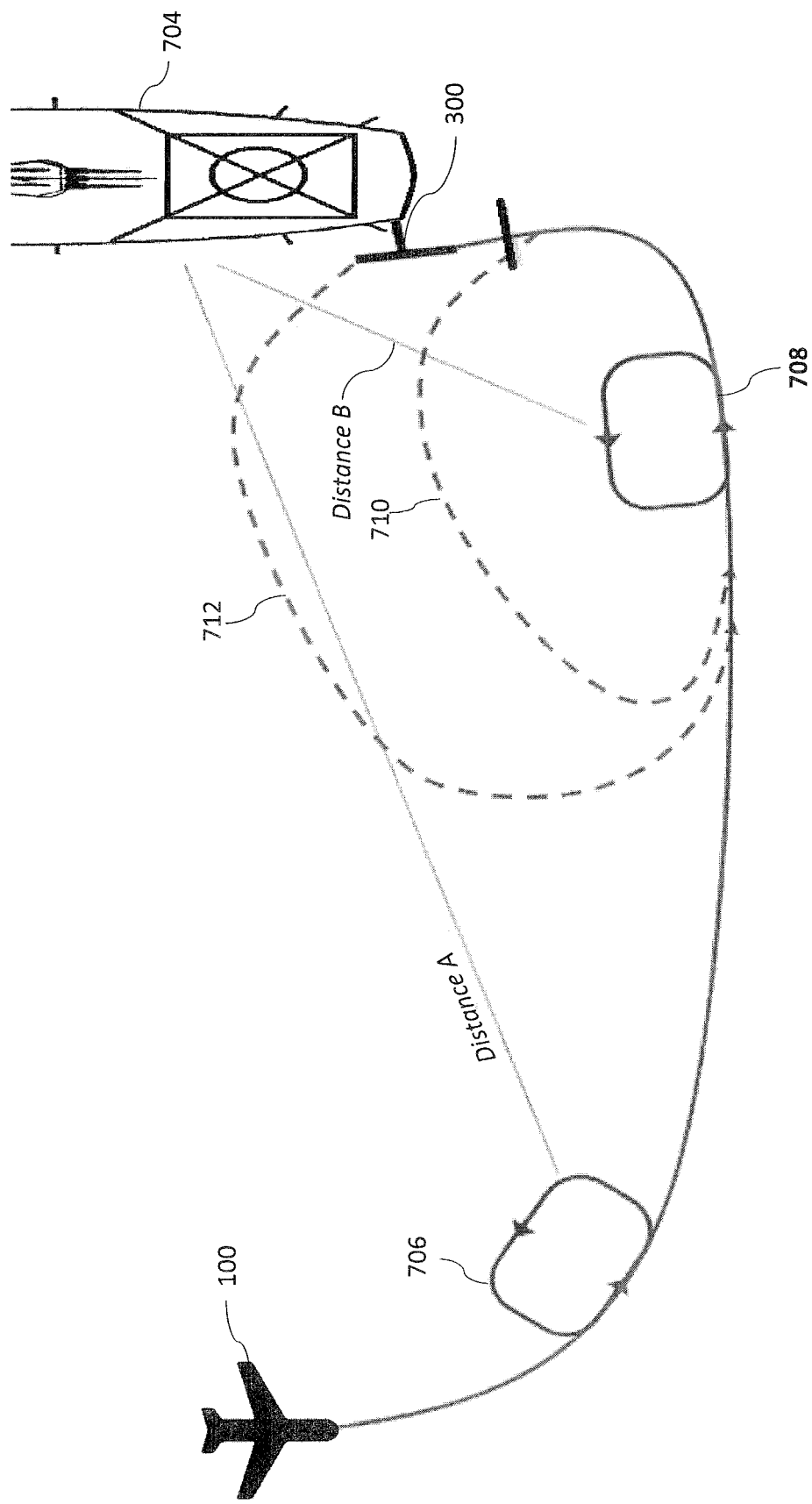
FIG. 7c illustrates an exemplary pre-capture flight path with go-around capabilities.

FIG. 7c illustrates an exemplary flight path used by an aircraft 100. The aircraft starts in an initial holding pattern 706 at Distance A from the ship 704. Distance A may preferably be about 1 to 5 miles, more preferably about 2 miles out from the ship 704. After the ship 704 is about to communicate with the aircraft 100, the aircraft 100 proceeds into a local holding pattern 708 at Distance B from the ship 704. Distance B may preferably be about 0.25 to 2 miles, more preferably about be preferably about 0.5 miles out from the ship 704. Once the aircraft 100 is cleared for capture, the aircraft 100 makes an attempt at being captured with the side-arm recovery system 300. During the capture phase the aircraft 100 may be recalculate dynamically (e.g., in real time or near real-time) the probability of capture according to the parameters illustrated in FIG. 7a. If the aircraft 100 receives a wave off command (e.g., from the ship 704), the aircraft may execute wave off flight path 710 and bank to divert away from the side-arm recovery system 300. When the aircraft 100 is about 2 seconds out from the side-arm recovery system 300, the aircraft 100 makes a final decision to execute capture or to fly past the side-arm recovery system 300 to conduct missed approach flight path 712. The exemplary flight path concludes with the aircraft 100 successfully captured by the side-arm recovery system 300.

FIGS. 8a through 8f illustrate an example recovery sequence of an aircraft 100 approaching a land-based side-arm recovery system 300, that is, a side-arm recovery system 300 coupled to land vehicle 800 (illustrated as a trailer-truck system). The size of the land-based side-arm recovery system 300 may be dictated by the base geometry (such as a truck trailer), aircraft ground clearance for defined terrain, aircraft clearance from the recovery system, and height constraints due to vehicle obstacle clearance and glideslope. A trailer-truck system generally comprises an articulated arm 302 mounted on a land vehicle 800 having a wheeled chassis. To prevent tipping, the land vehicle 800 may include one or more ground supports 802 (e.g., outriggers and jacks) to increase the footprint, thereby providing greater stability. The trailer-truck system may employ a single-engine machine, with the same engine powering the undercarriage and the articulated arm 302. The upper portion (e.g., the articulated boom) may be powered via hydraulics run through the turntable from the pump mounted on the lower portion (e.g., the truck and/or trailer). However, it is possible to employ two engines. For example, a first engine may be located in the lower portion and used for moving the vehicle along the road and running a hydraulic pump for operating the one or more ground supports 802. A second engine may be located in the upper portion and used to operate a hydraulic pump for the articulating arm 302.

Figure 8A:
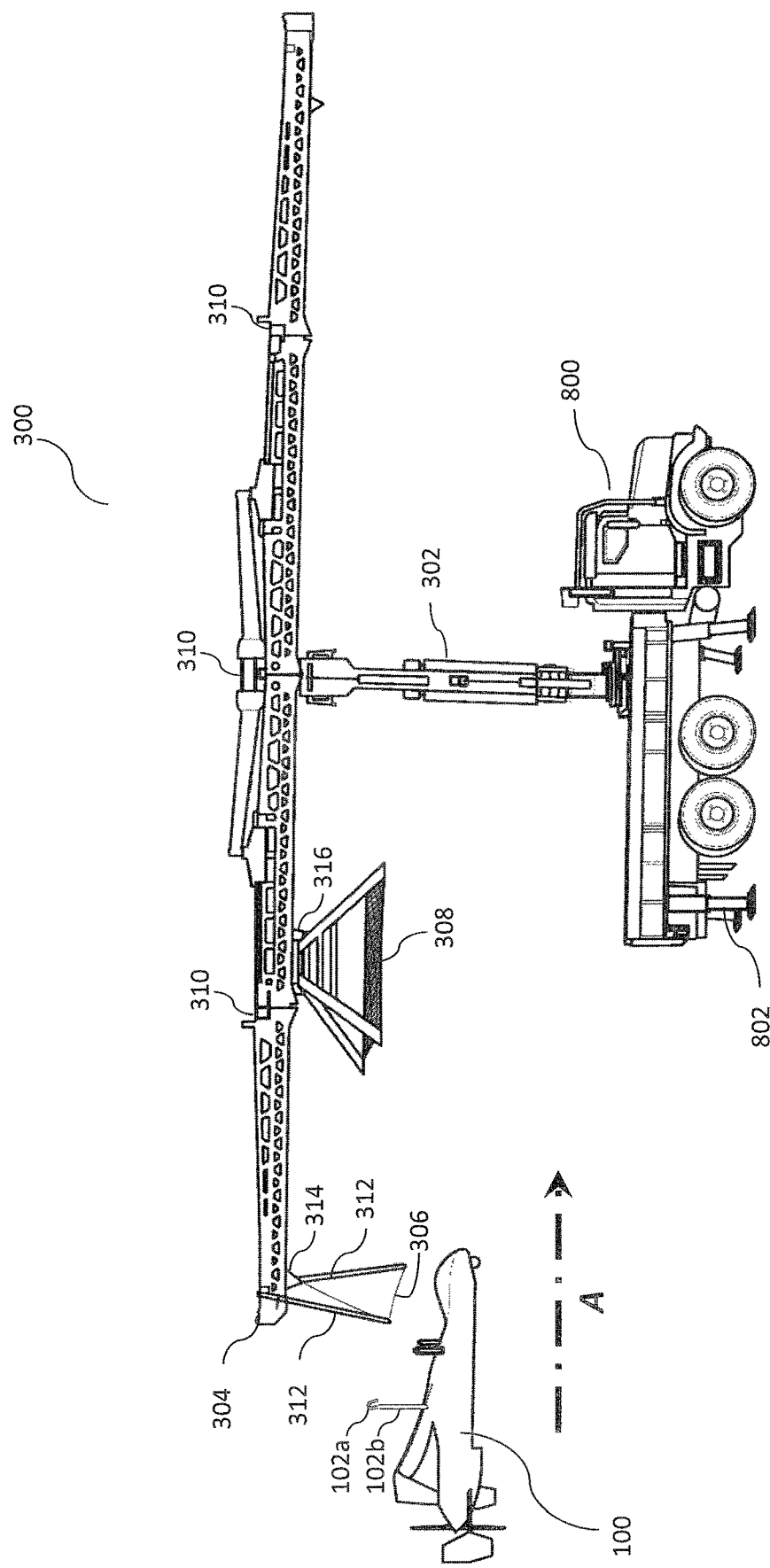
FIGS. 8a through 8f illustrate an example recovery sequence of an aircraft approaching a land-based side-arm recovery system.

After hook engagement, the aircraft 100 is slowed to a stop using the above-described techniques before being lowered to the ground via, for example, the articulating arm. More specifically, FIG. 8a illustrates an aircraft 100 during final approach to the side-arm recovery system 300. On approach, the aircraft 100 aligns its trajectory with the rail 304 axis and extends the top-hook assembly 102 from the fuselage 104 to an upright position (i.e., extended position). The aircraft 100 aligns its trajectory such that the tip of the hook aims towards the objective capture point of FIG. 7a, thereby presenting the best probability of capture while avoiding all interference with the stanchion structure. The recovery scheme is tolerant to failure of the primary hook to engage, where the aircraft 100 just continues flying adjacent the rail 304 and returns for another attempt (e.g., via the missed approach flight path 712).

Figure 8B:
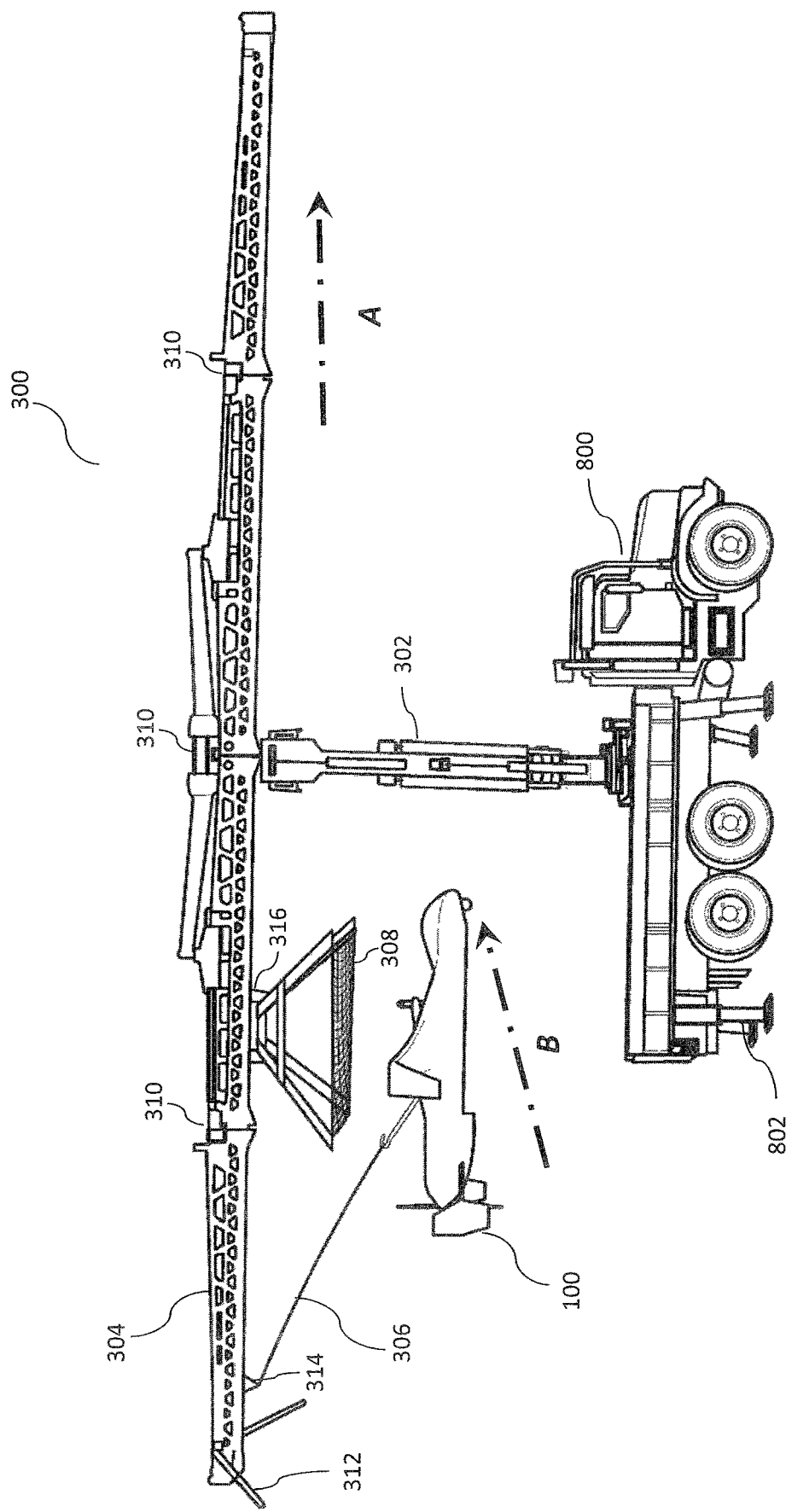

FIG. 8b illustrates the aircraft 100 during the capture phase and first arresting phase. The hook portion 102b first strikes the arresting cable 306 (stretched across a set of two stanchions 312), which may cause the boom portion 102b to bend back slightly. The aircraft 100 attitude is minimally affected as the aircraft 100 continues forward (Direction A). The arresting cable 306 then slides along the top-hook assembly 102 and into, for instance, a retainer positioned at the tip of the hook portion 102b. Because the arresting cable 306 is initially orthogonal to the top-hook assembly 102, the initial strike action does not impart a large shock to the aircraft 100. After the arresting cable 306 is engaged, the aircraft 100 draws the arresting cable 306 through the hook portion 102b. As the arresting cable 306 pays out according to the previously described techniques, the force on the aircraft 100 increases rapidly because of the combined effect of the direction and magnitude of the cable tension. The magnitude of the cable tension may be proportional to the arresting cable 306 pay-out velocity. As the cable pay-out length increases, the angle of cable relative to the hook decreases and the action of the cable on the hook increases. The action of the cable tends to align the aircraft 100 center of mass with the end of the stanchions 312 through the hook. Because of the offset of the hook pivot, the aircraft 100 pitches up (Direction B). The primary shuttle 314 is entrained forward and accelerates proportionally to its mass. The first arresting phase leads up to the peak deceleration.

Figure 8C:
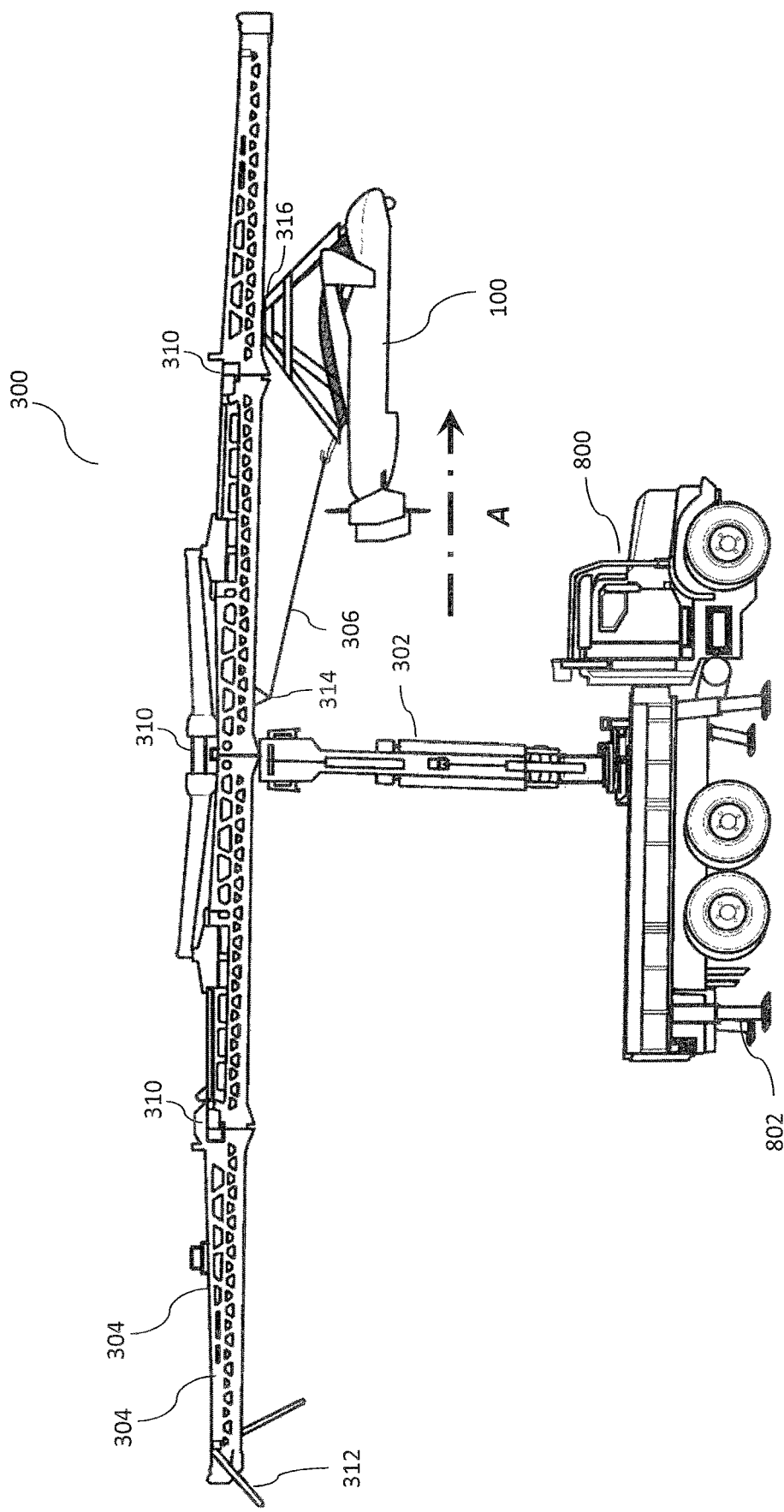

FIG. 8c illustrates an aircraft 100 during the second arresting phase. As the aircraft 100 decelerates the magnitude of the cable tension decreases as the cable pay-out velocity decreases. Concurrently, like a pendulum, some of the aircraft 100 kinetic energy is transferred into potential energy. The shuttle cable reels in, pulling the aircraft 100 and the primary shuttle 314 closer. The primary shuttle 314 accelerates and follows the aircraft 100 preventing the aircraft 100 from swinging back. As the aircraft 100 goes up, the aircraft's forward fuselage hook may capture a capture net 308 which is coupled to the secondary shuttle 316.

The capture net 308 applies a downward force on the aircraft 100 during the third arresting phase, and the aircraft's 100 forward velocity continues to decrease as both the primary shuttle's 314 and the secondary shuttle's 316 velocity decreases. Meanwhile the aircraft's 100 potential energy may be transferred to the capture net 308. Both the primary shuttle 314 and the secondary shuttle 316 stop when the forward force is lower than the friction resistance between the rail 304 and the primary shuttle 314 and/or the secondary shuttle 316. In addition, as mentioned above, a dead stop prevents both the primary shuttle 314 and the secondary shuttle 316 from sliding off the rail 304. After the aircraft's 100 potential energy is transferred, the aircraft 100 slowly oscillates to a resting position. Naturally, the above-described sequence may be varied depending on the designer's needs and/or a number of variables, including, for example, the type of aircraft, the weather, position of the side-arm recovery system 300, and so on. Once the aircraft 100 and the primary and secondary shuttles 314, 316 come to a complete stop, the aircraft 100 succumbs to the forces of gravity. To prevent the aircraft from falling to the ground, or into the water, barbs located on the forward fuselage hook 106 pierce the capture net 308 tensioned across the secondary shuttle 316. The aircraft hangs from these barbs after the capture is complete. The side-arm recovery system 300 then brings the aircraft 100 down to the ground using its articulating arm 302.

Figure 8D:
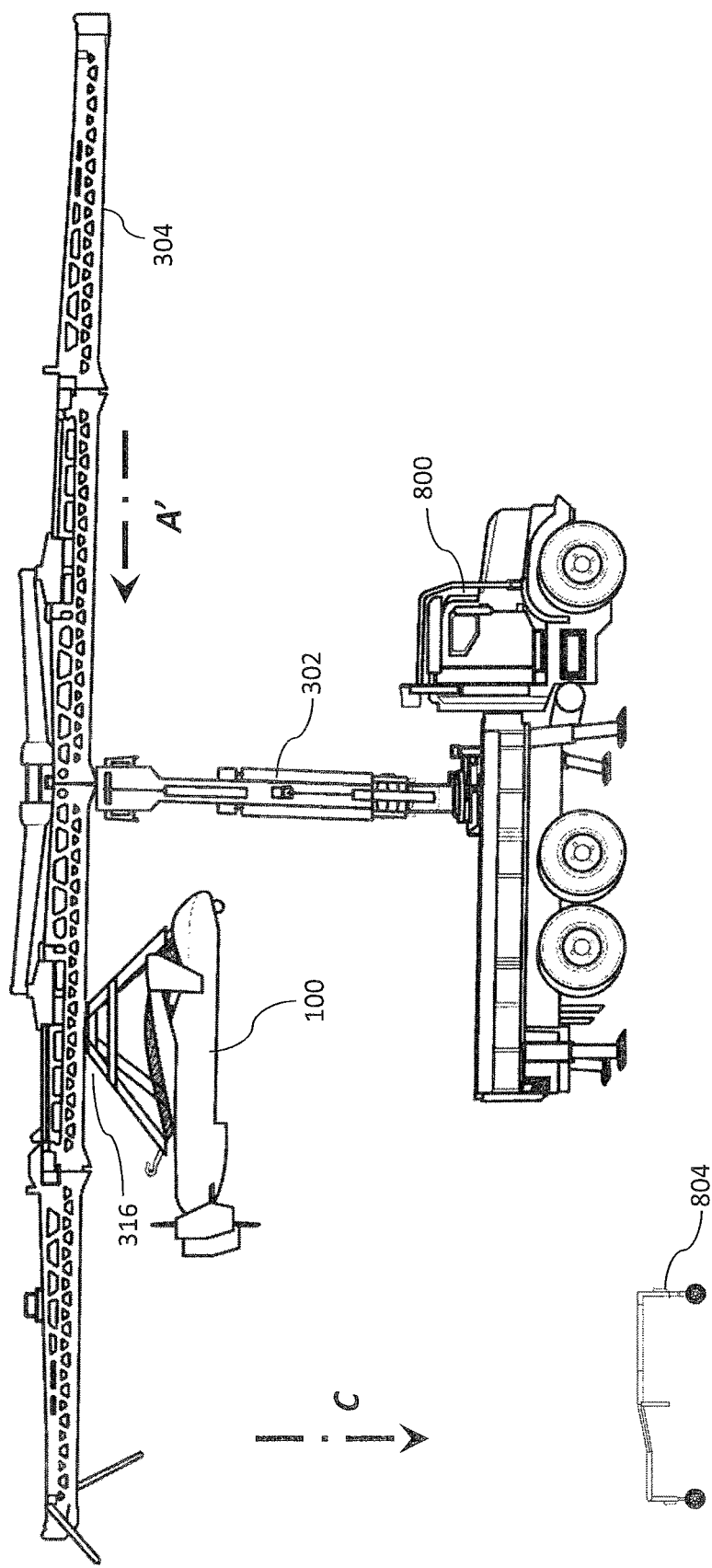
Figure 8E:
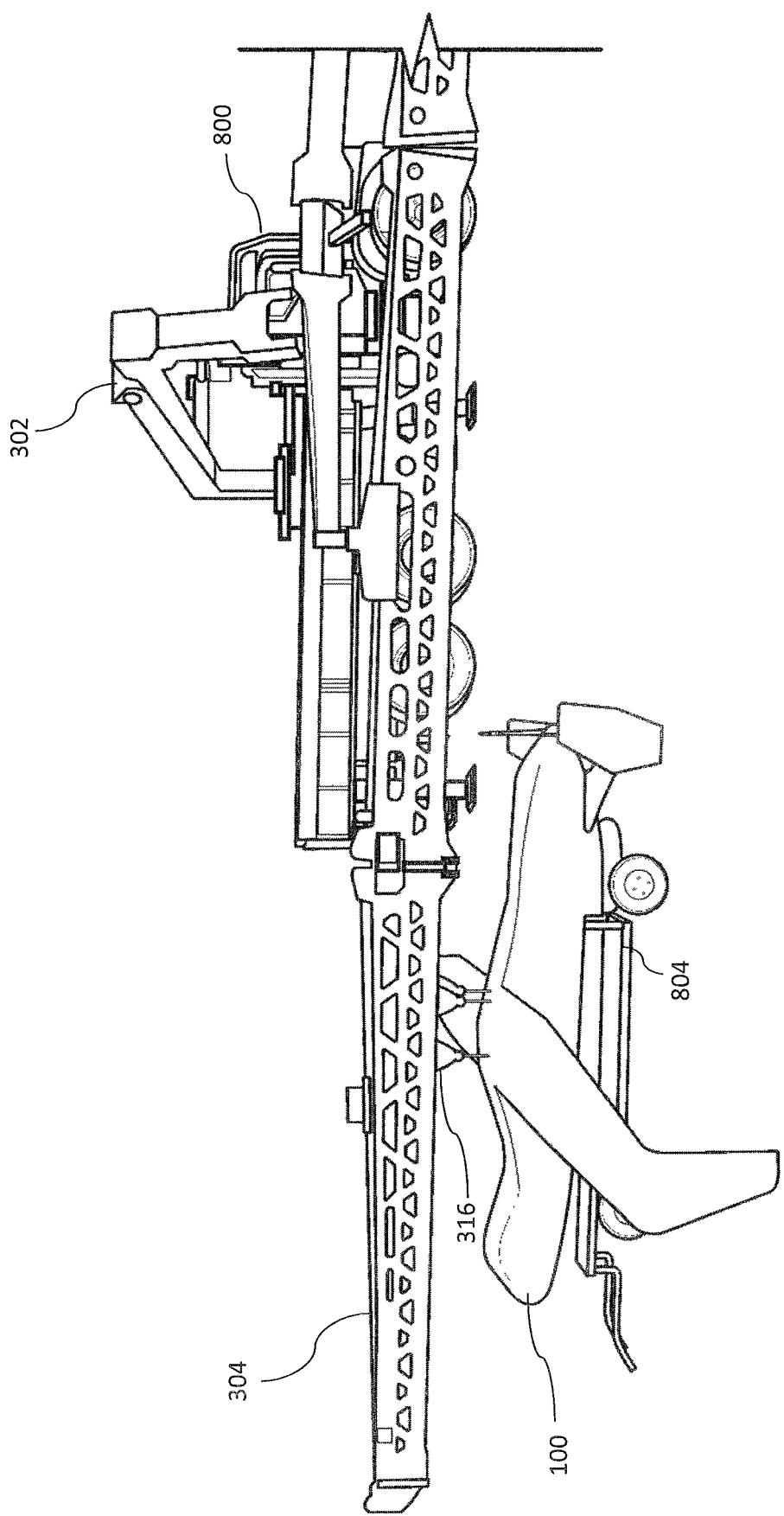

As illustrated in FIGS. 8d and 8e, the articulating arm 302 is fully adjustable. Thus, the articulating arm 302 may be used to relocate and/or transport an aircraft 100 during the recovery phase. For example, the articulating arm 302 may be used to move the aircraft 100 so that it may be serviced or stowed. Specifically, the aircraft 100, while secured to the first and/or second shuttles 314, 316, slides from the second end of the rail 304 (e.g., the final phase during recovery) in the reverse direction (Direction A') until the shuttle 316 has reached the first end of the rail 304. As illustrated in FIG. 8e, the articulating arm 302 may be used to lower the aircraft 100 onto the ground and/or a ground cart 804 by lowering the aircraft downward (Direction C) as illustrated in FIG. 8e. A ground cart 804 located under the system receives the aircraft 100, and the side-arm recovery system 300 may then be readied for the next launch or capture. FIG. 8e illustrates the side-arm recovery system 300 at the end of the recovery phase with the aircraft 100 resting upon a ground cart 804.

Figure 8F:
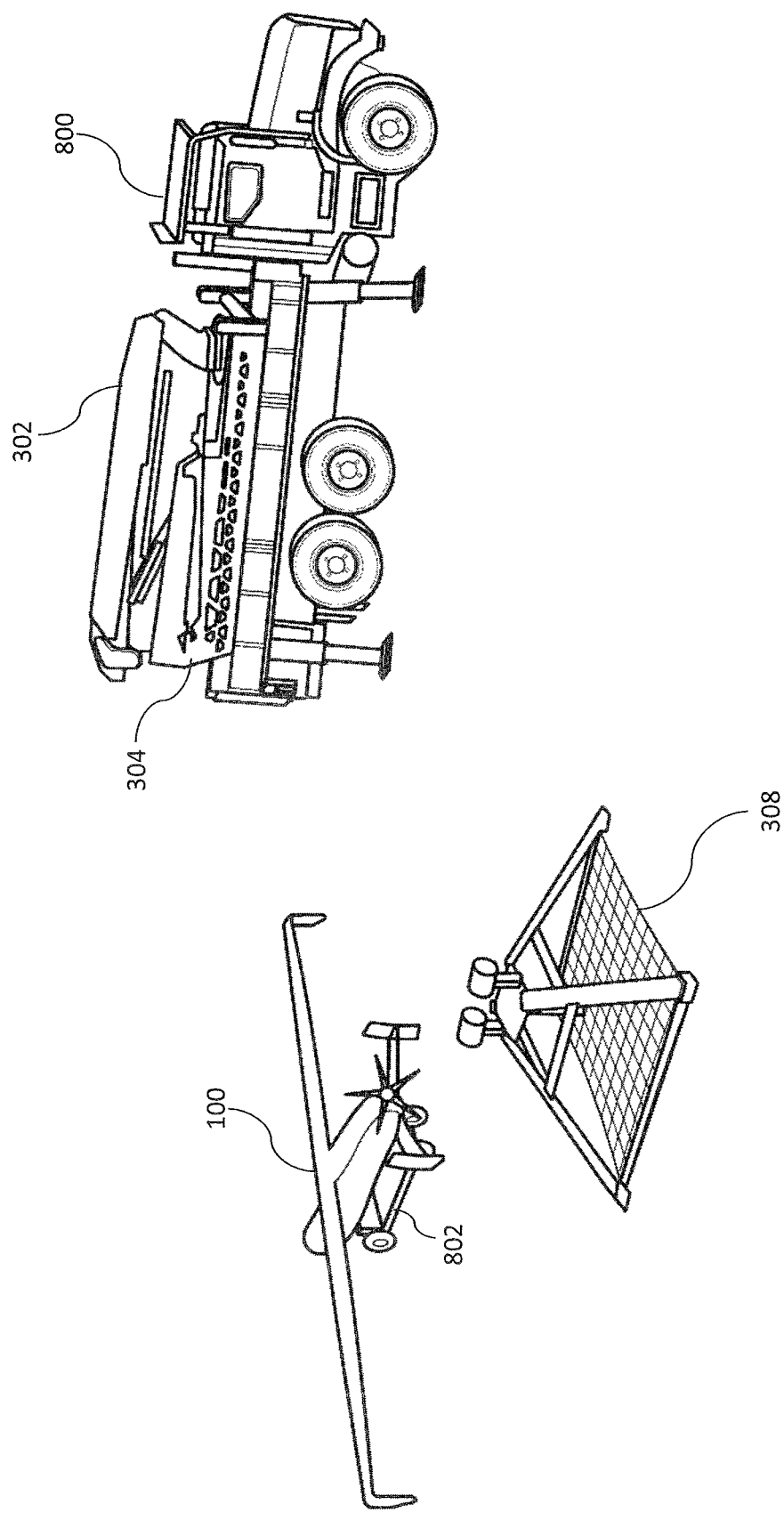

The articulating arm 302 may be folded and stowed on the land vehicle 800, while the aircraft 100 remains positioned on the ground cart 804. FIG. 8f illustrates the side-arm recovery system 300 completely stowed and the aircraft 100 separated from the side-arm recovery system 300. The side-arm recovery system 300, as depicted, may be modular to decrease stowed footprint, and allow for quicker transitions between launching and recovering aircrafts.

Figure 9:
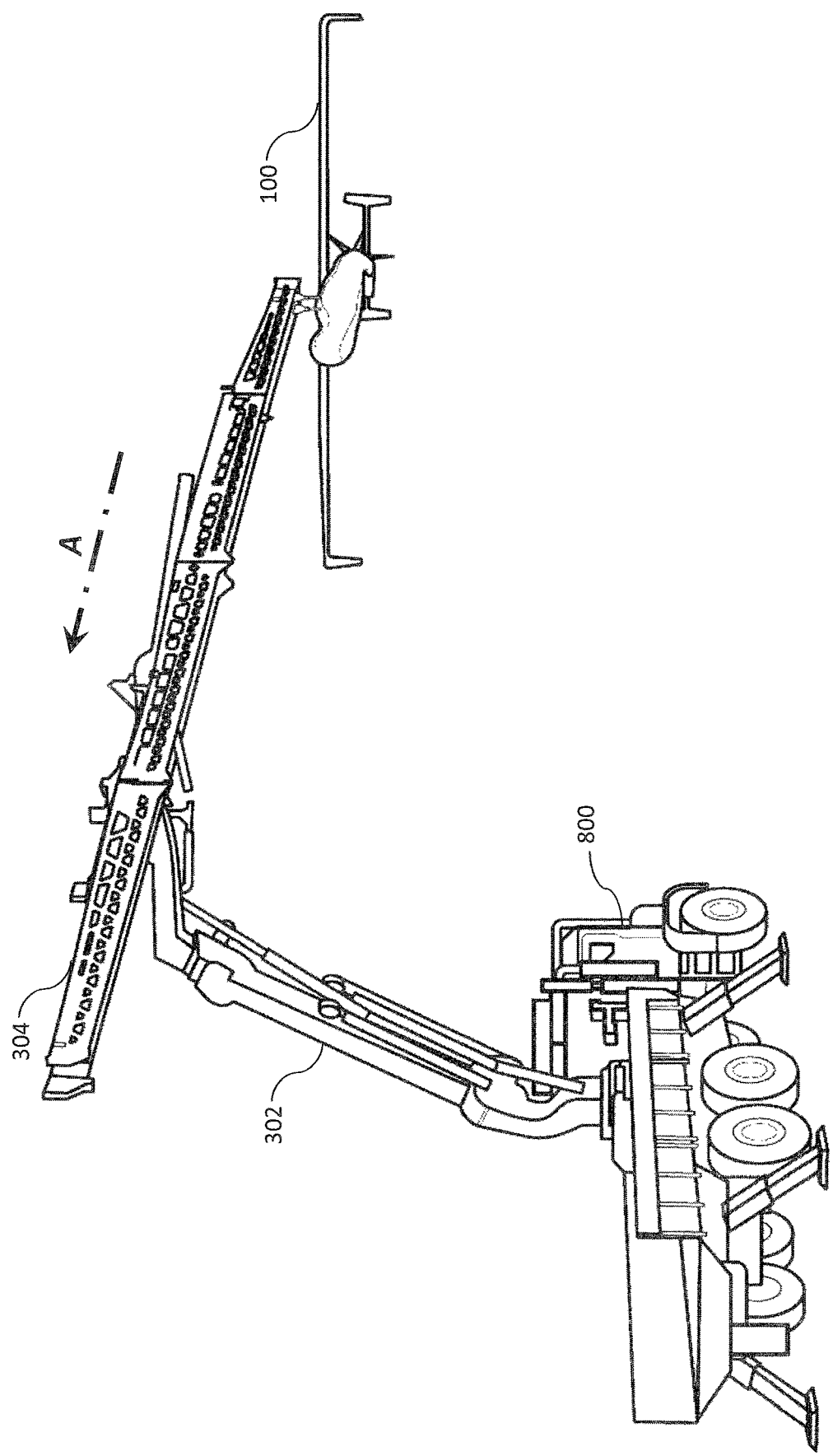
FIG. 9 illustrates the side-arm recovery system in a launch configuration.
Figure 10A:
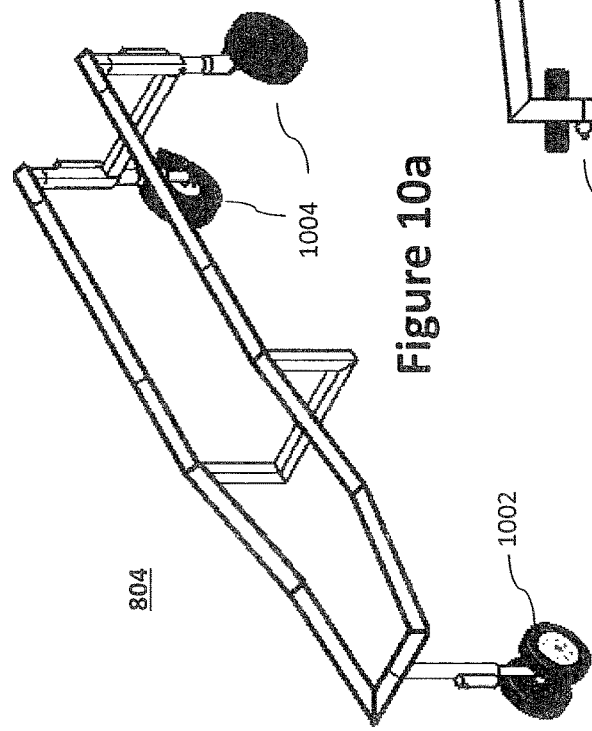
FIGS. 10a through 10d illustrate a loading chassis suitable for porting and handling of an aircraft.
Figure 10C:
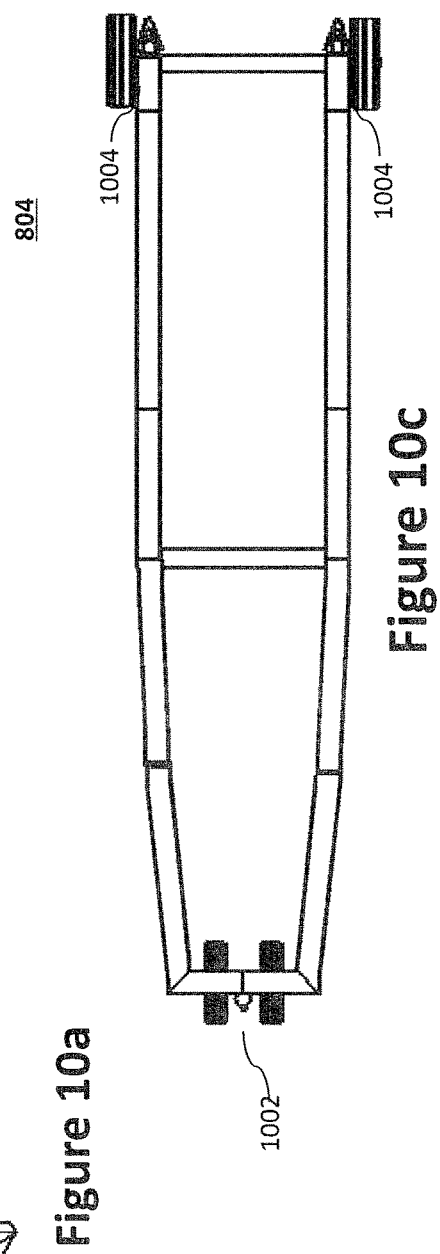
Figure 10B:
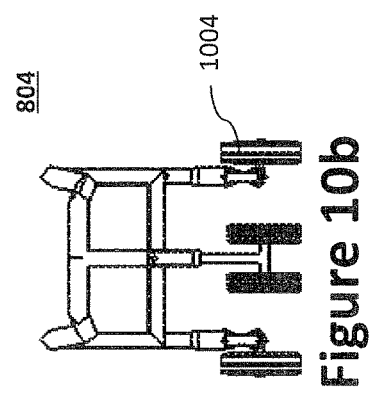
Figure 10D:
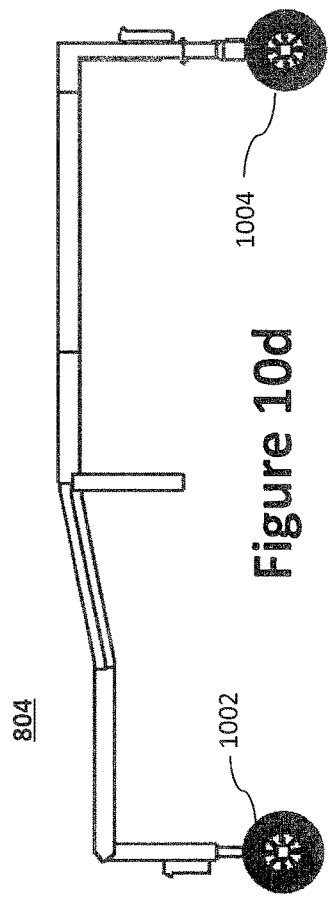

To minimize specialized operations and shipboard footprint, the side-arm recovery system 300 can be configured for launch operations with minimal configuration change. FIG. 9 illustrates an example launching configuration for the side-arm recovery system 300 when coupled with a land vehicle 800. The launch and capture peak accelerations are minimized. For example, the pivoting base of the side arm may be reoriented 90 degrees in azimuth, enabling a wide effective range (e.g., wind-over-deck), while minimizing operational impacts on the land vehicle 800 or ship 704 for both launch and recovery. The side-arm articulating arm can also be adapted to support the retrieval of Autonomous Underwater Vehicles ("AUVs") or small surface craft.

To reduce weight and cost, the aircraft may lack a conventional landing gear, relying instead on the ground cart 804 for deck handling and hangar stowage. Specifically, following recovery of the aircraft, the side-arm recovery system 300 safely lowers the aircraft to a deck handling cart. FIGS. 10a through 10d illustrate a ground cart 804, or cart, suitable for deck handling. As illustrated in the figures, the ground cart 804 may feature a square-cross-section, tubular steel frame and, for example, a tricycle configuration. Any tie-downs that are normally found on the landing gear of an aircraft may be relocated to the ground cart 804 in accordance with known standards, such as the principles of U.S. Department of Defense's AIR-STD-25. The aircraft may interface with the ground cart 804 using, for example, padded support structures in correspondence with the aircraft's main bulkheads and at a number of pickup points consisting of profiled stubs situated in correspondence with the weapons bay forward and aft bulkheads.

Twin nose wheels 1002 and the two aft wheels 1004 may be lowered and/or raised individually, or in unison, to achieve a more favorable stance depending on ground handling actions. When moving the ground cart 804, a lowered stance offers a lower center of gravity and a more stable platform. While secured with tie-downs, the raised position offers increased access to the underside of the aircraft for ease of maintenance and loading of ordnance. Raising the aft wheels 1004 and lowering the nose wheels 1002 lets the aircraft assume a position that facilitates wheeling a replacement engine under the aft fuselage 104 to hoist into the engine compartment. The design of the ground cart 804 frame may be designed to provide ease of access to maintenance-heavy areas such as the payload bay, engine compartment, avionics hatches, and EO/IR ball, and topside to the SATCOM radome. The shape of the frame skirts these areas and joins to strong airframe structural interfaces while achieving unimpeded accessibility to the desired areas. Unlike an aircraft, the design of the ground cart 804 is not hampered by airworthiness and aerodynamic performance constraints, thus it can be given better maneuverability and handling than that achievable by helicopters or aircraft being towed on their wheeled landing gear. In fact, the ground cart 804 may be designed with a nose wheel 1002 that is compatible with the A/S32A-32 aircraft towing tractor as well as the Shipboard Helo Handler (SHH).

FIG. 11 illustrates a chassis based aircraft recovery system 1100, which is akin to the trailer-truck system of FIG. 8a, but designed to allow the aircraft recovery system to be easily moved without the need of a crane or separate power plant (e.g., a land vehicle 800). The mobile chassis 1102 may be self-propelled utilizing either electrical or other various motor type to propel the mobile chassis 1102 into a desired location. Additionally, the mobile chassis 1102 may autonomously receive a location predetermined by an operator or the aircraft itself in order to travel to said location and deploy for autonomous aircraft capture. Once located at the desired location, the mobile chassis 1102 may be secured to the ground (e.g., via attachment points 1106) using a plurality of tie down cables 1104.

Although the present invention has been described with respect to what are currently considered to be the preferred embodiments, the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents, all articles, all brochures, and all other published documents discussed above are hereby incorporated by reference into the Detailed Description of the Preferred Embodiment.

What is claimed is:

1. A recovery system for capturing an aircraft in flight, the recovery system comprising:
   an articulating arm having a proximal end and a distal end, the articulating arm being secured to a surface at the proximal end;
   a rail coupled at the distal end of said articulating arm;
   a set of stanchions mounted to said rail;
   a first shuttle that is slideably coupled to said rail;
   an arresting cable coupled to said first shuttle;
   a second shuttle that is slideably coupled to said rail; and a capture net coupled to said second shuttle, wherein the capture net is configured to reduce post-capture motion of the aircraft caused by capture of the aircraft by said arresting cable.

2. The recovery system of claim 1, wherein the articulating arm is secured to the surface via a rotating base.

3. The recovery system of claim 1, wherein the arresting cable is configured to engage a first hook positioned on the aircraft.

4. The recovery system of claim 1, further comprising a payout mechanism to manage tension of the arresting cable.

5. The recovery system of claim 4, wherein the payout mechanism is coupled to the arresting cable via a payout cable and a dual pulley assembly.

6. The recovery system of claim 5, wherein the dual pulley assembly comprises a first pulley and a second pulley coupled to one another via a linkage bar.

7. The recovery system of claim 6, wherein the payout cable is coupled via the first pulley and the arresting cable is coupled via the second pulley.

8. The recovery system of claim 5, wherein the payout mechanism comprises a reel to let out or pull in the payout cable as a function of a load imparted on the arresting cable by the aircraft.

9. The recovery system of claim 8, wherein the payout mechanism is configured to pay out the payout cable when the load imparted exceed a predetermined load threshold.

10. The recovery system of claim 1, further comprising a deceleration mechanism to deaccelerate the first shuttle, wherein the deceleration mechanism is coupled to the first shuttle via a deceleration cable.

11. The recovery system of claim 10, wherein the deceleration mechanism comprises a reel to let out or pull in the deceleration cable as a function of a location of the first shuttle on the rail.

12. The recovery system of claim 11, further comprising a cable slack system to provide an additional loop of deceleration cable.

13. The recovery system of claim 12, wherein the cable slack system is to delay engagement of the deceleration mechanism.

14. The recovery system of claim 1, wherein the first shuttle is coupled to the second shuttle via a shuttle cable, the second shuttle being configured to slide along the rail in response to a force imparted on the first shuttle.

15. The recovery system of claim 1, wherein a second hook positioned on the aircraft is configured to engaged the capture net through upward angular momentum of the aircraft generated from initial deceleration of the aircraft.

16. The recovery system of claim 1, wherein the rail includes one or more rail hinges to facilitate folding of the rail for stowage.

17. The recovery system of claim 1, wherein each of the set of stanchions is spring loaded and is configured to move up and outwardly upon capturing the aircraft.

18. The recovery system of claim 1, wherein the arresting cable is stretched horizontally across the set of stanchions.

19. The recovery system of claim 1, wherein the second shuttle is independent of said first shuttle.

20. A recovery apparatus for capturing an aircraft in flight, the recovery apparatus comprising:
a rail;
a set of stanchions mounted to said rail;
a first shuttle that is slideably coupled to said rail;
an arresting cable coupled to said first shuttle;
a second shuttle that is slideably coupled to said rail, wherein said second shuttle is independent of said first shuttle; and
a capture device coupled to said second shuttle, wherein the capture device is configured to reduce post-capture motion of the aircraft caused by capture of the aircraft by said arresting cable.

21. The recovery apparatus of claim 20, further comprising a payout mechanism to manage tension of the arresting cable, wherein the payout mechanism comprises a reel to let out or pull in the payout cable as a function of a load imparted on the arresting cable by the aircraft.

22. The recovery apparatus of claim 21, wherein the payout mechanism is configured to pay out the payout cable when the load imparted exceed a predetermined load threshold.

23. The recovery apparatus of claim 20, wherein the arresting cable is stretched horizontally across the set of stanchions.

* * * * *